(12) United States Patent
Yuschik

(10) Patent No.: US 6,526,382 B1
(45) Date of Patent: Feb. 25, 2003

(54) LANGUAGE-ORIENTED USER INTERFACES FOR VOICE ACTIVATED SERVICES

(75) Inventor: Matthew John Yuschik, Andover, MA (US)

(73) Assignee: Comverse, Inc., Wakefield, MA (US)

( * ) Notice: Subject to any disclaimer, the term of this patent is extended or adjusted under 35 U.S.C. 154(b) by 0 days.

(21) Appl. No.: 09/456,922

(22) Filed: Dec. 7, 1999

(51) Int. Cl.[7] ............................................... G10L 15/22
(52) U.S. Cl. ..................................... 704/275; 704/257
(58) Field of Search ................................ 704/270, 275, 704/257, 231, 9, 251, 3

(56) References Cited

U.S. PATENT DOCUMENTS

| | | | |
|---|---|---|---|
| 4,181,821 A | | 1/1980 | Pirz et al. |
| 4,688,195 A | | 8/1987 | Thompson et al. |
| 4,747,127 A | | 5/1988 | Hansen et al. |
| 4,785,408 A | | 11/1988 | Britton et al. |
| 4,827,419 A | * | 5/1989 | Selby, III ..................... 701/200 |
| 4,829,423 A | | 5/1989 | Tennant et al. |
| 4,931,935 A | | 6/1990 | Ohira et al. |
| 4,994,983 A | * | 2/1991 | Landell et al. .............. 704/245 |
| 5,054,054 A | | 10/1991 | Pessia et al. |
| 5,136,631 A | | 8/1992 | Einhorn et al. |
| 5,243,643 A | | 9/1993 | Sattar et al. |
| 5,323,452 A | | 6/1994 | Dickman et al. |
| 5,425,128 A | | 6/1995 | Morrison |
| 5,452,340 A | * | 9/1995 | Engelbeck et al. .... 379/216.01 |
| 5,463,713 A | | 10/1995 | Hasegawa |
| 5,748,191 A | | 5/1998 | Rozak |
| 5,748,841 A | | 5/1998 | Morin et al. |
| 5,765,132 A | | 6/1998 | Roberts |
| 5,806,033 A | | 9/1998 | Lyberg |
| 5,946,658 A | | 8/1999 | Miyazawa et al. |
| 5,949,854 A | | 9/1999 | Sato |
| 5,983,200 A | * | 11/1999 | Slotznick ....................... 705/1 |
| 6,138,100 A | * | 10/2000 | Dutton et al. ................. 704/10 |
| 2002/0072900 A1 | * | 6/2002 | Keough et al. ............. 704/220 |

FOREIGN PATENT DOCUMENTS

EP 911 808 A 4/1999

OTHER PUBLICATIONS

European Search Report in corresponding European patent application EP 310830.5 of the above referenced US patent application, European Patent Office, dated Aug. 14, 2002, 4 pages.

* cited by examiner

Primary Examiner—Richemond Dorvil

(57) ABSTRACT

A comprehensive system is provided for designing a voice activated user interface (VA UI) having a semantic and syntactic structure adapted to the culture and conventions of spoken language for the intended users. The system decouples the content dimension of speech (semantics) and the manner-of-speaking dimension (syntax) in a systematic way. By decoupling these dimensions, the VA UI can be optimized with respect to each dimension independently and jointly. The approach is general across languages and encompasses universal variables of language and culture. Also provided are voice activated user interfaces with semantic and syntactic structures so adapted, as well as a prompting grammar and error handling methods adapted to such user interfaces.

7 Claims, 13 Drawing Sheets

| MAIN MENU | END OF MESSAGE | MESSAGE OPTIONS | FAX DESTINATIONS |
|---|---|---|---|
| LISTEN<br>SEND<br>PRINT FAX<br>OPTIONS<br><br>HELP<br>INTRODUCTION<br>VOICE HINTS<br>GOOD-BYE | DELETE<br>LISTEN AGAIN<br>SAVE<br>SKIP MESSAGE<br><br>(CALL BACK)<br>(REPLY)<br>SEND A COPY<br>(PRINT FAX)<br><br>(CANCEL<br>MAIN MENU<br>HELP) | SEND<br>EDIT<br>SCHEDULE<br><br>URGENT<br>CONFIDENTIAL<br>REPLY REQUESTED<br><br>(CANCEL<br>MAIN MENU<br>HELP) | DEFAULT<br>PRINT FAX<br>FORWARD<br><br>(CANCEL<br>MAIN MENU<br>HELP) |

| MAILBOX OPTIONS | FAX SETTINGS | EDIT MESSAGE | GROUP LISTS |
|---|---|---|---|
| GREETING<br>PASSWORD<br>NAME<br><br>FAX SETTINGS<br>GROUP LISTS<br>SECURITY<br>ENVELOPE<br><br>(CANCEL<br>MAIN MENU<br>HELP) | FORWARD<br>DESTINATION<br>SCHEDULE<br>DONE<br><br>(CANCEL<br>MAIN MENU<br>HELP) | REVIEW<br>RE-RECORD<br>DONE<br><br>(CANCEL<br>MAIN MENU<br>HELP) | EDIT<br>CREATE<br>DELETE<br>NAME<br><br>(CANCEL<br>HELP<br>MAIN MENU) |

| | | SEND OPTIONS | WAKE-UP WORD |
|---|---|---|---|
| | | SEND<br>ADD A COMMENT<br><br>(CANCEL<br>HELP<br>MAIN MENU) | INTERRUPT MESSAGE<br>JUMP TO END |

| CONFIRMATION | FAX FORWARDING |
|---|---|
| YES<br>NO | FORWARD ALL<br>NON-CONFIDENTIAL<br>DEACTIVATE<br><br>CANCEL<br>MAIN MENU<br>HELP |

| CONFIRMATION OTHER |
|---|
| YES<br>NO<br>CANCEL<br>HELP |

FIG. 4

A LIST OF THE VOCABULARY SET TEST QUESTIONS IS GIVEN BELOW. THE FIRST WORD, IN THE BRACKET, EXPRESSES THE UNDERLYING CONCEPT, THOUGHT NOT NECESSARILY THE ANSWER. IT IS EXPECTED THAT SYNONYMS OF THIS WORD BE GIVEN IN RESPONSE TO THE QUESTION THAT FOLLOWS.

PLEASE LISTEN TO THE FOLLOWING QUESTIONS, THEN SAY YOUR RESPONSE AFTER THE TONE. SAY THE WORD OR WORDS THAT YOU WOULD USE TO COMMAND A COMPUTER.

1. [GREETING] WHEN PEOPLE CALL YOU AND ARE FORWARDED TO YOUR ANSWERING SERVICE, THEY HEAR A MESSAGE YOU HAVE RECORDED FOR EVERYONE THAT CALLS YOU. WHAT DO YOU CALL THE MESSAGE THEY HEAR?
2. [CANCEL] YOU MADE A MISTAKE, AND NOW YOU WOULD LIKE TO STOP AND START OVER? WHAT DO YOU SAY?
3. [TUTORIAL] WHEN YOU FIRST USE THE SERVICE, YOU HEAR A DESCRIPTION OF THE SERVICE WITH INSTRUCTIONS ON HOW TO USE IT. WHAT WOULD YOU CALL THIS DESCRIPTION?
4. [PRINT FAX] YOU HAVE A FAX DOCUMENT IN YOUR MAILBOX WHICH YOU WOULD LIKE TO PUT ON PAPER. WHAT WOULD YOU SAY TO DO IT?
5. [PASSWORD] TO MAKE SURE THAT ONLY YOU ARE ALLOWED TO LISTEN TO YOUR MESSAGES, YOU MAY USE A SPECIAL FOUR DIGIT NUMBER TO PROTECT YOUR MAILBOX. WHAT WOULD YOU CALL THAT NUMBER?
6. [SAVE] YOU LISTENED TO A MESSAGE AND WANT TO STORE IT. WHAT WOULD YOU SAY?
7. [CALL BACK] YOU HEAR AN IMPORTANT MESSAGE AND WANT THE SERVICE TO CALL TO THE PERSON BACK IMMEDIATELY. WHAT WOULD YOU SAY TO DO IT?
8. [INTERRUPT WORD] YOU START LISTENING TO A MESSAGE IN YOUR MAILBOX, AND DON'T WANT TO HEAR THE REST OF IT. WHAT WOULD YOU SAY TO INTERRUPT THE MESSAGE?
9. [RETRIEVE/LISTEN] YOU HAVE A VOICE MESSAGE IN YOUR MAILBOX. WHAT WOULD YOU SAY TO HEAR THE MESSAGE?
10. [MAIN MENU] YOU FINISHED LISTENING TO YOUR MESSAGES. WHAT WOULD YOU SAY TO GO BACK TO THE BEGINNING OF THE SERVICE?
11. [FINISHED] YOU ARE ENTERING TELEPHONE NUMBERS INTO THE SERVICE. WHAT WOULD YOU SAY WHEN YOU HAVE ENTERED ALL THE NUMBERS?
12. [HELP] YOU HAVE HAVING DIFFICULTY USING THE SERVICE. WHAT DO YOU SAY TO LEARN MORE?
13. [TRANSFER/FORWARD/SEND A COPY] YOU LISTENED TO A MESSAGE AND WANT SOMEONE ELSE TO GET IT. WHAT WOULD YOU SAY TO DO THIS?
14. [DELETE] YOU HAVE LISTENED TO A MESSAGE AND DON'T WANT IT ANY MORE. WHAT WOULD YOU SAY TO GET RID OF IT?
15. [SKIP] YOU ARE LISTENING TO A MESSAGE THAT IS NOT VERY USEFUL. YOU WANT TO JUMP TO THE END. WHAT WOULD YOU SAY?
16. [RECORD] YOU WANT THE SERVICE TO TAPE WHAT YOU PLAN TO SAY INTO IT. WHAT WORD WOULD YOU SAY?
17. [CHANGE/MODIFY/EDIT] TELEPHONE NUMBERS ARE LISTED IN YOUR SERVICE. YOUR FRIEND JUST GOT A NEW TELEPHONE NUMBER. WHAT DO YOU SAY TO REVISE YOUR LIST?
18. [ADD/CREATE] YOU WANT TO PUT SOME NEW INFORMATION ON A LIST. WHAT WOULD YOU SAY?
19. [NEW SUBSCRIBER SETUP] IT IS YOUR FIRST TIME USING THE SERVICE. YOU WANT TO PERSONALIZE YOUR DEFAULT DATA. WHAT WOULD YOU SAY?
20. [DESTINATION] YOU NEED TO ENTER A NUMBER WHERE A MESSAGE IS TO BE SENT. WHAT DO YOU CALL THIS NUMBER?
21. [SEND] YOU HAVE RECORDED A MESSAGE. WHAT DO YOU SAY TO HAVE IT TRANSMITTED?
22. [REPLY] YOU RECEIVED A MESSAGE, AND WANT TO SEND A MESSAGE BACK TO THAT PERSON. WHAT WOULD YOU SAY TO DO THIS?
23. [SCHEDULE] YOU HAVE A MESSAGE YOU WANT DELIVERED IN THE FUTURE. WHAT WOULD YOU SAY TO PROGRAM THE DELIVERY TIME?
24. [NAME] OTHER PEOPLE HEAR YOUR NAME WHEN THEY SEND A MESSAGE TO YOUR MAILBOX. WHAT DO YOU CALL YOUR RECORDING?
25. [REVIEW] YOU HAVE A LIST OF NAMES STORED IN THE SERVICE. WHAT WOULD YOU SAY TO HEAR ALL OF THEM?
26. [ENVELOPE] YOUR MESSAGES HAVE THE DATE AND TIME IT WAS RECEIVED. WHAT WORD DO YOU PREFER TO CALL THIS, THE HEADER OR ENVELOPE?
27. [REPLY REQUESTED] YOU WOULD LIKE TO ASK FOR A REPLY BACK FROM YOUR MESSAGE. WHAT WOULD YOU SAY TO DO THIS?
28. [HEADER] WHAT WORD DO YOU PREFER TO USE, ENVELOPE OR HEADER?
29. [OPTIONS] WHAT WORDS WOULD YOU PREFER TO SAY, MAILBOX OPTIONS OR MAILBOX SETTINGS?

FIG. 5

LANGUAGE-ORIENTED USER INTERFACES FOR VOICE ACTIVATED SERVICES

BACKGROUND OF THE INVENTION

1. Field of the Invention

The present invention relates to user interfaces for voice actuated services. In particular, the present invention relates to user interfaces specifically adapted to the spoken language of the target users. The present invention specifically provides both language-oriented user interfaces and generally applicable systems and methods for building such language-oriented user interfaces.

2. Description of the Related Art

A user interface is a component or tool of a computer system that enables a user to interact with the computer system, either to issue instructions controlling the operation of the system, enter data, examine results, or perform other operations in connection with the functions of the system. In effect, the user interface is the computer's "cockpit." That is, the user interface presents information about the computer's operation to the user in an understandable form, and it enables the user to control the computer by converting the user's instructions into forms usable by the computer. Various types of user interfaces exist, such as text (or "command line") interfaces, graphical user interfaces ("GUIs"), Dual Tone Multi-Frequency (DTMF) interfaces, and others.

"Voice activated" (VA) or "voice controlled" (VC) user interfaces are a promising alternative type of user interface that enable users to interact with the computer by spoken words. That is, rather than typing in text commands, pressing numbers on a telephone keypad, or "clicking" on a graphical icons and menu items, the user provides instructions and data to the computer merely by speaking appropriate words. The ability of a user interface to receive inputs by voice signals has clear advantages in many application areas where other means of input (keyboard, telephone keypad, mouse or other pointing device, etc.) are unavailable or unfamiliar to the user.

Unfortunately, voice activated user interfaces ("VA UIs") have generally failed to provide the level of usability necessary to make such devices practical in most application areas. This failure has been due in part to inherent technical challenges, such as the difficulty of reliably converting spoken words into corresponding computer instructions. However, continuing advances in acoustic signal recognition (ASR) technologies have largely removed such obstacles. The persistent inadequacies of existing VA UIs therefore arise from design flaws in the UIs themselves, rather than lack of adequate implementing technology.

Currently, voice activated user interfaces (VA UIs) are designed and implemented in an ad hoc manner. Most developers overlay a voice-activated UI onto a dual-tone multiple frequency (DTMF) UI and perform after-the-after fact testing on the integrated unit. Tests of these system are therefore performed without consideration of the change in input modality (spoken versus DTMF keypresses) and for the new usability effects generated by the coupling between the various submodules of the system.

Trial and error is the most common approach for VA UI design and development. The vocabulary wordset for the service is often the literal translation of the English command words used for the task into the target language. Two typical prompting structures are (1) to list out all the options at once and wait for the subscriber to speak the choice (either at the end or by barging-in), or (2) to say the options one at a time, and provide a pause or yes/no question to signal the subscriber to make a choice. Textual (visual) UIs essentially follow the first approach, while DTMF UIs use the second approach. Explicit turn-taking is generally signalled by introducing a tone to indicate that the subscriber should speak.

However, to serve the needs of users effectively, a VA UI must have characteristics and must satisfy ease-of-use requirements different from those of a DTMF or visual/textual UI. The need for these differences arises because verbal dialogues are dynamic social interactions and differ across languages and cultures in ways that are not paralleled in visual or written interactions. To have any practical significance, therefore, a VA UI must flexibly accommodate different command words, tempos in which they are spoken, and ways in which turn-taking is signaled in the language in which the human-machine conversation is taking place. Put another way, designing a VA UI to be more than a technical curiosity requires more than simply adding (overlaying, substituting) command words to a DTMF service. All users, whether first-time, average, or experienced, must find the UI highly acceptable and easy to use.

On the other hand, it has been the accepted wisdom that present-day software technology is too rudimentary to make possible user interfaces that are actually easy to use. U.S. Pat. No. 5,748,841, issued May 5, 1998, to Morin et al., expresses this view as follows: "In one respect, the problem may be that even complex computer applications and computer programs do not provide the flexible input/output bandwidth that humans enjoy when interacting with other humans. Until that day arrives, the human user is relegated to the position of having to learn or acquire a precise knowledge of the language that the computer application can understand and a similar knowledge of what the computer application will and will not do in response. More precisely, the human user must acquire a knowledge of enough nuances of the application language to allow the user to communicate with the application in syntactically and semantically correct words or phrases."

Thus, the state of the art in user interface technology has explicitly assumed that effective use of a practical user interface requires the user to learn the syntax and semantics that are employed by the user interface. There has existed an unmet need for a user interface adapted to the conventions of the user's spoken language. Heretofore this need has actually been considered to be unmeetable with existing software technology. This need has been particularly acute for voice activated user interfaces, because the conventions of spoken language vary much more widely between different communities than the conventions of written language. Furthermore, voice activated services may have greatest potential for growth among users with little computer experience, provided usable VAUIs that follow univeral spoken language principles become available.

SUMMARY OF THE INVENTION

It is an object of the present invention to provide a method of designing language-oriented user interfaces for voice activated services.

The present invention provides, in a first aspect, a method for designing a voice activated user interface, the method comprising separately selecting a vocabulary set and a prompting syntax for the user interface based on results of first testing with subjects from a target community. The method further comprises jointly optimizing the vocabulary set and the prompting syntax based on results of second testing with subjects from the target community.

In a second aspect, the invention provides a method for selecting a vocabulary set for a voice activated user interface. The method of this aspect comprises collecting responses to task-oriented questions eliciting commonly used names for tasks and task-related items, and selecting a plurality of responses from the collected responses based on frequency of occurrence in the collected responses.

In a third aspect, the invention provides a computer system and computer software providing a service through a voice activated user interface. The computer system comprises a storage and a processor. The storage has a vocabulary of command words stored therein, each command word being selected from responses to questions posed to members of a test group. The processor interprets a spoken response based on the stored command words. The computer software comprises instructions to perform the corresponding operations.

In a fourth aspect, the invention provides a method for defining a prompting syntax for a voice actuated user interface. The method of this fourth aspect comprises identifying an initial value for each of one or more syntax parameters from samples of dialogue in a conversational language of a target community. The method further comprises specifying an initial temporal syntax for the user interface based on the one or more identified initial values.

In a sixth aspect, the invention provides a method for optimizing a prompting syntax of a voice actuated user interface, the method comprising testing performance of tasks by subjects from a target community using a the interface implemented with a command vocabulary and a temporal syntax each selected for the target community. The method of this aspect further comprises modifying the temporal syntax based on results of the testing.

In a seventh aspect, the invention provides a method for defining a prompting syntax for a voice activated user interface, the method comprising specifying an initial temporal syntax for the user interface based on initial syntax parameter values identified through dialogue analysis. The method of this aspect also comprises modifying the initial temporal syntax based on results of testing user performance with the user interface using a selected command vocabulary with the initial temporal syntax.

In a eighth aspect, the invention provides a method for optimizing a voice activated user interface, the method comprising configuring the user interface with a vocabulary of command words including at least one word indicating a corresponding task and selected from plural words for the task based on frequency of use. The method of this aspect also comprises changing at least one of a command and a syntax parameter of the user interface based on results of testing the user interface with speakers of a target language.

In a ninth aspect, the invention provides a method for adaptive error handling in a voice activated user interface. The method comprises detecting that an error has occurred in a dialogue between the user and the user interface based on a change in behavior of the user. The method further comprises reprompting the user when the error is an omission error, and returning to a previous menu state responsive to a correction command by the user when the error is a commission error.

In a tenth aspect, the invention provides a method for adaptive error handling in a voice activated user interface. The method of this aspect comprises detecting that an error has occurred in a dialogue with the user interface following a prompt delivered according to a first prompting structure, and reprompting the user according to a second prompting structure when a count of errors exceeds a predetermined value.

In an eleventh aspect, the invention provides a method for adaptive error handling in a voice activated user interface, the method comprising selecting an error prompt level based on an accumulated number of user errors when a user error occurs in a dialogue between the user interface and a user. The method of this aspect further comprises reprompting the user according to the selected error prompt level.

In an twelfth aspect, the invention provides a computer system and computer software providing a service to a user through a voice activated user interface. The computer system comprises a storage and a processor. The storage stores a menu of commands usable by the user in a dialogue between the user and the user interface. The processor detects an error in the dialogue based on a change in behavior of the user, reprompts the user when the error is an omission error, and returns to a previous menu state responsive to a correction command when the error is a commission error.

In an thirteenth aspect, the invention provides a computer system and software providing a service to a user through a voice activated user interface, the computer system comprising a storage and a processor. The storage stores a menu of commands usable by the user in a dialogue between the user and the user interface. The processor prompts a command selection by the user according to a first prompting style, detects an error in the dialogue when the error occurs, and prompts a command selection by the user according to a second prompting style when a count of errors by the user during the dialogue exceeds a predetermined value.

In an fourteenth aspect, the invention provides a method for prompting a user of a voice activated user interface. The method of this aspect comprises pausing for a first predetermined interval after presentation of a label identifying a current menu state of the user interface. The method further comprises presenting to the user a command option for the current menu state only when a command is not received from the user during the predetermined interval.

In an fifteenth aspect, the invention provides a method for developing an automatic speech recognition (ASR) vocabulary for a voice activated service. The method comprises posing, to at least one respondent, a hypothetical task to be performed and asking each of the at least one respondent for a word that the respondent would use to command the hypothetical task to be performed. The method of this aspect further comprises receiving, from each of the at least one respondent, a command word developing a list of command words from the received command word, and rejecting the received command word, if the received command word is acoustically similar to another word in the list of command words.

Additional objects and advantages of the invention will be set forth in part in the following description and, in part, will be obvious therefrom or may be learned by practice of the invention.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 4 shows an chart of command sub-menus and command functions for an exemplary voice controlled voice mail service;

FIG. 5 shows a table of exemplary vocabulary testing questions adapted for use with various aspects of the present invention;

DESCRIPTION OF THE PREFERRED EMBODIMENTS

Figure 1:
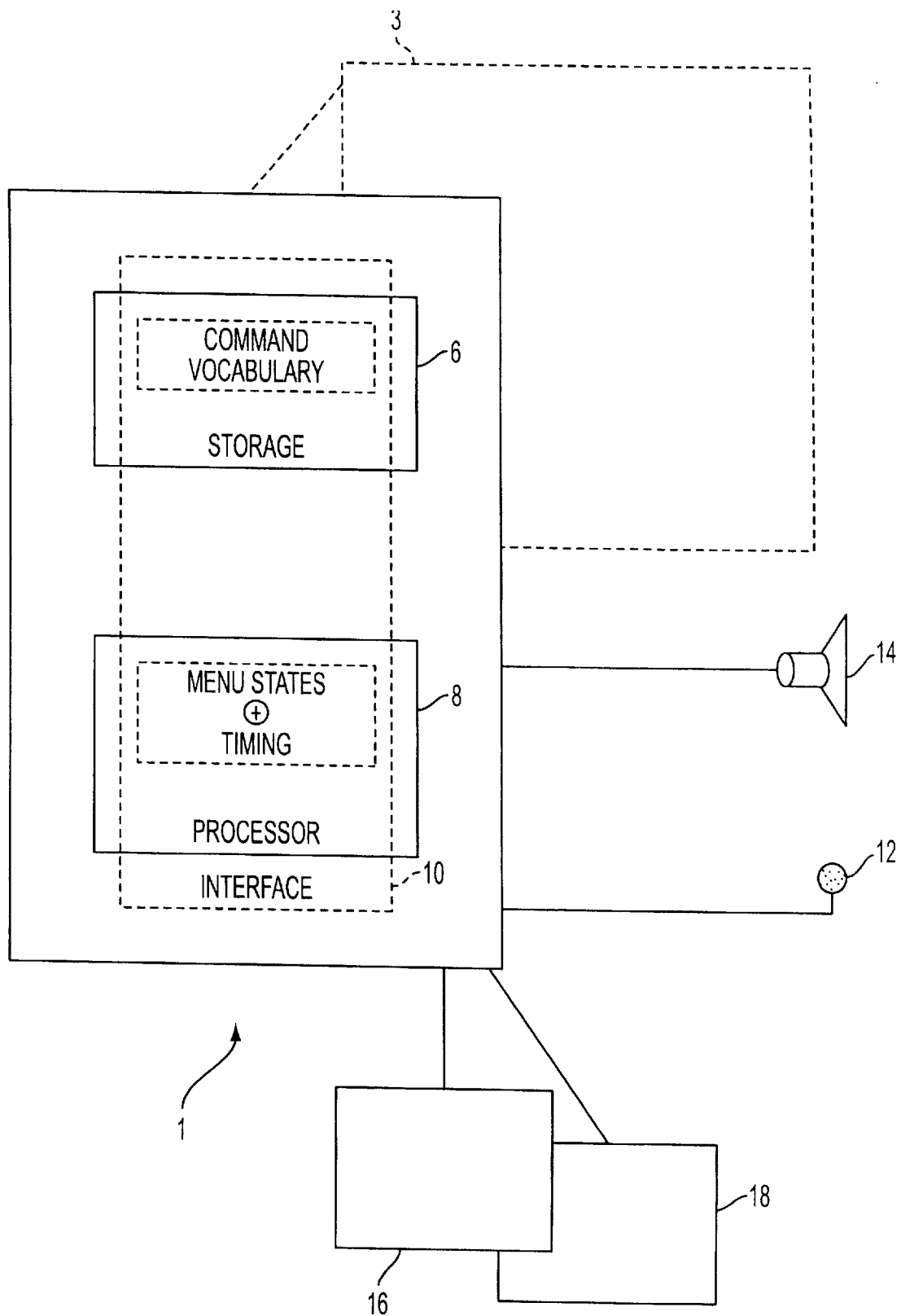
FIG. 1 is a block diagram illustrating a general context for and several embodiments of the present invention.

Reference will now be made in detail to the presently preferred embodiments of the invention, examples of which are illustrated in the accompanying drawings, wherein like reference numerals refer to like elements throughout.

OVERVIEW

FIG. 1 illustrates a computer system 1 that provides both a general context for and several selected embodiments of the present invention. System 1 may itself provide a useful service to users, or system 1 may constitute a "front end" through which users communicate with another system coupled to system 1, such as computer system 3.

Computer system 1 includes a storage 8, which may be a mass storage device (such as a magnetic or optical disk drive), a memory device, or other suitable data storage device. A processor 6 uses programs and data retrieved from storage 8 to provide a VA UI 10 through which a user (not shown) can interact with computer system 1. The user may provide inputs to system 1 through a sound conversion device such as microphone 12. Typically responses or other information may be output to the user through a sound generating device such as loudspeaker 16, which preferably generates synthesized or recorded voice sounds.

The VA UI 10 is preferably implemented by a software program running on processor 8 and conceptually illustrated in FIG. 1 as a dashed box including on the one hand a command vocabulary stored in the storage 8, and on the other hand a process running on the processor 6. The process, labeled "MENU STATES⊕TIMING" in FIG. 1, defines menu states for the VA UI 10 and timing for the flow of a dialogue between a user and the VA UI 10. Alternatively, VA UI 10 may be implemented in special purpose circuits that may be composed of integrated circuits or discrete components. Computer system 1 may be used by the user, through interactions with the VA UI 10, to obtain services or to perform tasks. These services may be performed by other software programs running on processor 8 or by one or more other processors (not shown) included in computer system 1. Alternatively, the services or task performance may be provided by any of peripheral devices 16, 18, etc., which may be included in computer system 1, or by computer system 3 in communication with computer system 1.

The present invention embodies novel and unusual concepts for designing a voice activated interface such as VA UI 10. Heretofore there have existed few de facto guidelines for design and development of a VA UI. Consistent with the fact that few services and deployments exist, all of the existing principles have been ad hoc in nature and narrow in scope. The user has been expected to adopt the vocabulary of the UI, without any recognition that the user might naturally choose different words to designate given tasks. Further, there has been a failure to consider explicitly the possibility of dialog management through verbal (or implicit) "turn taking," in which an opportunity for response is signaled by the manner of speaking, and a response is anticipated. Even more so, the existing approaches have failed to recognize the effects on VA UI performance of variations in social interactions from country to country, or even from region to region within a country.

The present invention proceeds from the realization that an effective VA UI should be designed to account for two complementary aspects of spoken dialogue that roughly correspond to the linguistic concepts of semantics and syntax. These paired concepts appear in a dialogue as content and manner of speaking, and they correspond to the functional characteristics of parallel association and temporal linearity. Hence "verbal semantics," or simply "semantics," will here encompass what the words mean and when the meaning of a concept is understood. "Verbal syntax," or simply "syntax," includes the temporal structure underlying the sequence of spoken words and the grammatical relationships between the words.

The invention provides a universal framework that expressly accounts for the distinct aspects of semantics and syntax in a VA UI. The invention also provides a mechanism for explicitly accommodating cross-cultural spoken language variations in verbal communication. The semantics of the VA UI can be designed to incorporate commonly used words in the spoken language of the intended users. The specific language variant as spoken by the expected user population for the service will be called the "target language."

Further, the invention allows the VA UI to incorporate the syntactic conventions particular to the language and culture of the expected users. The community of expected users will be called the "target community." A "conversational language" of the target community is a language habitually used by members of the target community for routine conversations such as casual talk, routine purchases or business transactions, and so forth. Typically the target language of the VA UI will be such a conversational language of the target community.

A key discovery embodied in the present invention is that the design of different components of a VA UI can proceed separately. That is, it has been found that the design process for a VA UI can be "decoupled" based on linguistic universals as applied to spoken language. The decoupled components are defined and refined separately, and then combined in the task domain for integrated optimization. The UI design, testing and modification processes of the present invention focus on the means to decouple content (semantics) and manner (syntax) in a systematic way. The recognition that such a decoupling is possible, and implementation of this decoupling in a structured methodology, permits significant improvement in performance of the resulting VA UI.

Figure 2:
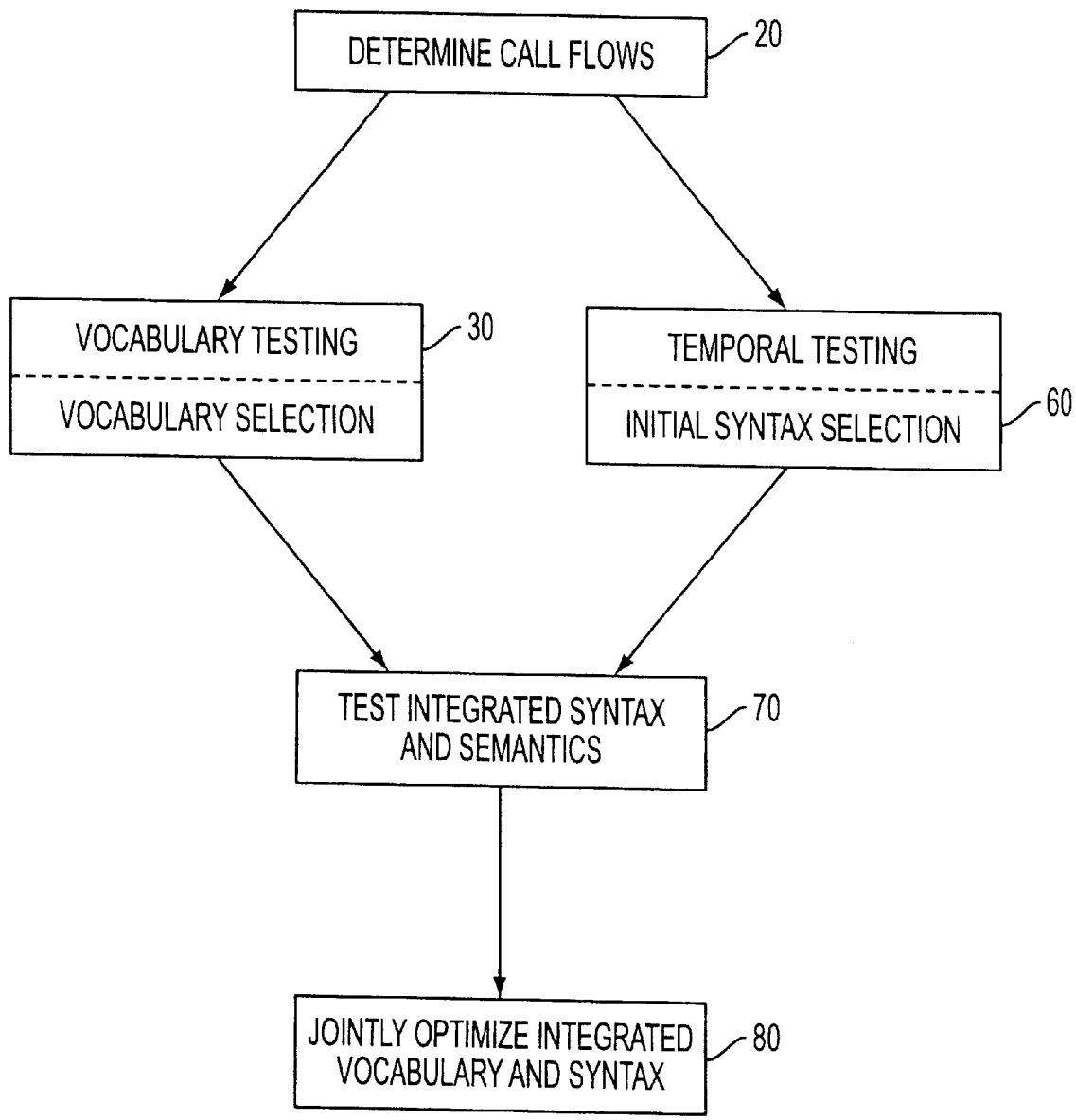
FIG. 2 shows an overview flow diagram of a method provided by the present invention.

FIG. 2 shows a conceptual diagram of a VA UI design process of the present invention. The first step is to decouple UI semantics and syntax, to the degree possible. Definition of the call flows for the target application is conceptually represented by block 20. The analysis of semantics and syntax are then "decoupled" by following separate design tracks for vocabulary and temporal structure, respectively. These separate design tracks can be implemented either serially or in parallel.

Block 30 of FIG. 2 represents the semantics design track, which encompasses vocabulary testing and selection of a language-specific preferred vocabulary set. These procedures will be discussed in detail below with reference to FIG. 3. Block 60 represents the syntax design track, which corresponds to proposing an initial structure for temporal testing on the sequences of temporal operations leading to selection of initial syntax parameters for specification of an initial language-specific syntax structure. Whereas the vocabulary testing track centers around a question-and-answer paradigm to elicit information relating to word content, the syntax testing track of block 60 centers around a paradigm of eliciting spoken "sentences" from the test subjects. In this context, a "sentence" may be a grammatically correct sentence, a phrase, a series of phrases, or any other fragment of spoken language for which the temporal structure may be characteristic of spoken conversation in the target community. Procedures for syntax specification will be discussed in detail with reference to FIG. 6.

Block 70 represents the integration stage of the design process, where the separate vocabulary set and syntax structure are combined into an integrated language-specific dialogue structure for the UI and tested against performance criteria. Block 80 represents the optimization stage of the design process, where the integrated dialogue structure is modified based on the results of the performance testing.

The customization of the syntax for a target language begins with an analysis of conversational manner, which then permits the specification of the initial temporal syntax for the dialogue. The goal is to identify a syntactical structure incorporating language-specific temporal features, such as pausing and pacing that provide turn-taking cues, and placing them into a temporal template, defined by temporal rules for that grammar.

The invention also embodies the discovery of a general prompt grammar (or syntactical template) that is particularly effective for VA UIs, and a method for prompting users of a voice-activated UI. The method includes a first embodiment in which a menu name is stated to set a context, a first pause for rapid response is provided, and then several sets of menu selections are offered to the user in succession. Each set of menu selections is a conceptual "chunk" of 2-4 choices. The chunk size, although conventionally thought to be a memory-dependent constant, is here considered to be a culturally-dependent variable.

With initial semantic and syntactic structures defined, the next step is to combine these structures into a "prompting structure." Here the term "prompting structure" will refer to an integrated dialogue structure composed of a semantically appropriate vocabulary word set implemented with a language-specific temporal syntax. The prompting structure is then optimized as a unit. The present invention provides a method for optimizing the customized semantics and the initial syntax in combination, thereby to fine-tune the syntax and optimize the usability of the VA UI. This approach allows the integrated prompting structure to be fully adapted to the speech conventions of a particular language and culture.

The method involves having each test participant engage in an interaction with the aforementioned words in a baseline syntax to achieve service-specific tasks. The user works to complete the tasks, and data are collected on key variables such as task duration, barge-in frequency and location, and throughput rate. Data also may be collected through interviews and questionnaires. It is preferred that alternative prompting structures are tested and compared to isolate the effects of syntactic changes.

The basic realization of the approach enables selection of the best words the subscriber should say to the service, and construction of the best prompts that the service should say to the subscriber. The approach is general across all spoken languages, encompasses language and cultural universals, and applies to any voice activated service. Voice Control of Voice Mail (VCVM) is used herein to illustrate the VA UI design techniques of the present invention since it provides significant complexity in which to reference VA UI instantiations. However, persons of ordinary skill in the art will readily appreciate that the examples described herein can be easily applied to other VA applications by following a similar methodology.

The principle of decoupling the semantic and syntactic parts of the UI also provides advantages when applied to error handling. In a further aspect, the invention provides an adaptive error handling and error correction method that employs a general error-handling paradigm of notification, status, and solution, with its own syntax and semantics. As a further embodiment of semantic and syntactic decoupling, the method treats errors of omission and errors of commission separately.

Semantic Structure

A significant and unusual aspect of the present invention is a method for designing a voice command vocabulary, or "wordset," (for voice recognition) with command words chosen to make the VA UI both reliable and easy to use. This method addresses the wordset semantics of the UI and balances common (natural) usage and acoustic (recognition) differentiation. Specifying the vocabulary word set semantics for a VA service begins by addressing the often-conflicting criteria of user acceptance and acoustic discrimination. The process utilized here is to identify command words by asking speakers of the target language indirect questions and to receive responses that contain words most likely to be spoken by service subscribers to invoke a service feature or function.

The design of the semantic component therefore begins with a second level of decoupling in which pure semantics are separated from acoustic analysis. This enables a set of optimal choices for the overall vocabulary set to be specified. The resulting, theoretically semantically optimal vocabulary set is then re-combined with acoustics and optimized in the context of sub-vocabulary recognition accuracy.

An embodiment of the method may proceed according to the following outline. First, a basic set of questions in the target language is prepared. The questions are designed to elicit responses that are words (or short phrases) commonly used to identify outcomes or commands for the target VA application. Frequent responses are selected as likely command words and grouped into subvocabularies corresponding to the various command menus of the service application. Acoustic analysis of each subvocabulary identifies pairings that may present problems for acoustic differentiation, and appropriate substitutes are selected from the list of semantically equivalent responses. Some vocabulary words occur in multiple subvocabularies, so analysis is performed for each word across all applicable subvocabularies.

Figure 3:
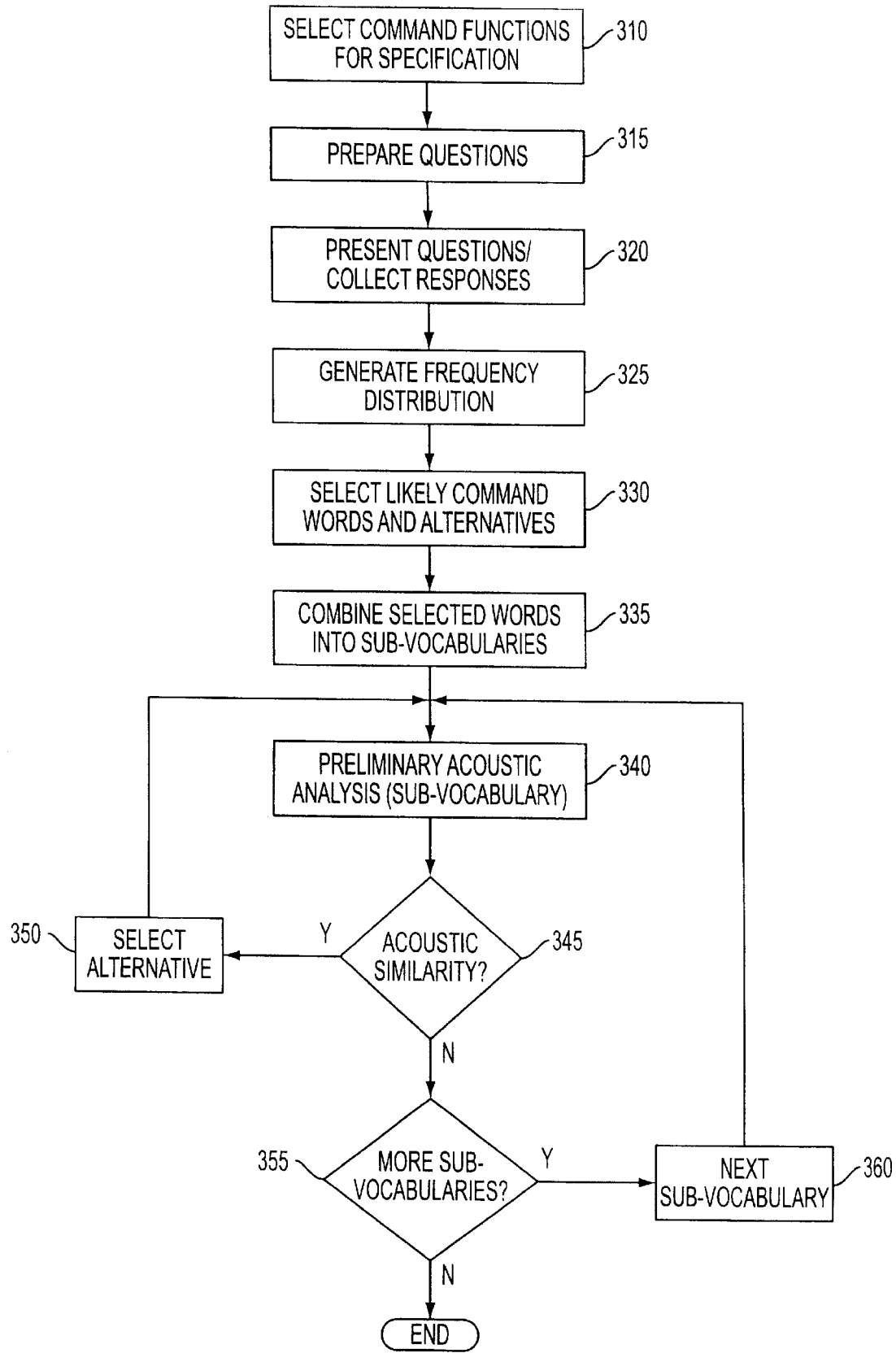
FIG. 3 shows a more detailed flow of a method for vocabulary selection provided by the present invention.

FIG. 3 illustrates a flow diagram, corresponding to block 30 in FIG. 2, that details implementation of the invention to select a preferred vocabulary set for the target application and the target community. The illustrated method encompasses operations for vocabulary testing, followed by acoustic differentiation. The goal of the sequential method is to identify a final set of most likely words that can be expected to be spoken in the target language as commands to the voice-activated service.

The goal of the vocabulary test is to identify a final set of most likely words that can be expected to be spoken in the target language as commands to the voice activated service. Here, "word" means a word or phrase that is spoken to indicate an integral task concept. For example, "erase" may be used to instruct the system to erase a message just recorded, while skip password" may be used to instruct password verification to be omitted. Thus, in this description the technical term "word" is not limited literally to single words in the target language.

In the following description, occasional reference will be made to a voice-controlled voice mail (VCVM) service as an example VA application. These references to the VCVM service are purely for purposes of concrete examples and are not intended to imply that the present invention is limited to voice mail services. Rather, as noted above, the invention provides a universal framework applicable to all voice activated services. Examples of such services in telecommunications fields include personal assistant, voice activated dialing, directory assistance, reverse directory assistance, call routing, switch-based feature activation, and so forth. The invention also has application to voice activated services in other areas of commerce and industry, as will be apparent to those of skill in the art.

The first stage of the illustrated method, at block 310, is to select those command functions of the target application for which command words will be specified using vocabulary testing. It is preferred, for cost effectiveness of the design process, that only command functions meeting certain criteria be specified by testing in the target language. The selection process of block 310 will now be explained.

FIG. 4 illustrates a set of sub-menus and command words (in American English) for the exemplary VCVM service. The target service for the VA UI imposes constraints on the set of words which may be used to execute the service. The set of words used in the non-VA service, such as the command words illustrated in FIG. 4, provides an initial guess at the target words to be investigated.

This base set may be composed of the existing key words used in the call flows. By identifying the key words and looking at each call flow of the service, a table can be made which lists the word and the call flow in which the word is used. The base words are then rank-ordered according to frequency of use in the service. This provides a quantitative measure (also called a "local performance indicator," or "local PI") by which a cost-benefit analysis can be performed. The cost-benefit analysis identifies the base words for which target-language specification is expected to have the greatest impact on the service. In other words, specification of these high-ranking (i.e., most frequent) words will provide the greatest benefit in usability of the VA UI for the fixed cost to obtain each specification result.

It has been found that words in the base set tend to aggregate into three major categories, which are termed "universal," "uncertain," and "distributed." Universal base words are those for which test responses are found to be limited substantially to a single word. Uncertain words are those for which the test responses are more-or-less equally divided across many choices. Distributed words correspond to having one clear preference in the test responses, yet there are other viable alternatives which can also be used.

Base words that are universal or uncertain need not be included in the semantic testing, and therefore the cost of the semantic analysis for those words can be avoided. Instead, for a universal word the preferred procedure is to use the (single) response word as defined by the subscribers. For an uncertain word, the vocabulary word is preferably selected by the service developer from the available responses. This leaves the distributed words of the base set as the command functions selected for specification at block 310.

The next stage, at block 315 of FIG. 3, is to prepare questions for the vocabulary testing. These are very simple, general, spoken questions that are posed to volunteer members of the target community. The questions are translated and presented in the target language and are designed to elicit responses from the test subjects (the volunteers) that will be candidates for the final vocabulary set. The objective is to ask questions that will be answered with words commonly used by members of the target community to indicate the application-specific commands or items of the target application. Here a "question" is a request for a response, irrespective of whether the request is formed as a literal interrogatory statement. For example, an imperative statement beginning "Please state the word you would use for . . . " would constitute a "question" for the present purposes.

An example set of such questions, adapted for use with the exemplary VCVM application discussed herein, is illustrated in FIG. 5. The preferred question format follows a scenario/goal paradigm. For example, the question may describe a scenario relating to a specific task, and then specify a goal related to that task. In a preferred form of the questions, a short introductory statement orients the listener to the nature of the task.

The questions are designed to elicit responses relevant to the target application. Thus, the example questions in FIG. 5 relate to functions and tasks ordinarily performed with a voice mail application. The questions are preferably ordered according to difficulty, with easy questions in the beginning, so that the test subjects build confidence as they perform the test. Also, it is desirable that similar questions not be located close together in the question sequence.

It is preferred that the questions be purposely formulated to be vague, in order not to pre-dispose the subject to selection of words that are used in the prompting questions. This helps to ensure that the subject does not merely "parrot" words that are heard in the particular prompt or in a previous question. It is also preferred that the questions be open-ended, rather than multiple-choice. The open-ended format has the advantage of forcing the subject to formulate an original response, rather than merely choosing from a list.

A second stage of the question preparation, after the questions have been formulated and translated, is a pilot test to refine the questions prior to the primary vocabulary testing. The purpose of the pilot test is to finalize the word-set questions by identifying and eliminating any confusing aspects. This ensures that the final word-set questions have no ambiguity and are readily understood. Preferably the pilot test comprises presenting the questions to a few subjects (for example, 4–5 members of the target community) in the target language. A tape recorder may be used to record the questions and responses for later, more detailed analysis. Also, the test questions may be followed by post-test interviews.

A native speaker then records the questions onto a computer running in data collection mode using a "voice form" IVR application. In a particularly preferred implementation, the test system includes a set of telephones accessing a TRILOGUE (TM) computer, by Comverse Network Systems, Inc. The TRILOGUE (TM) computer has multiple active incoming channels and typically runs a set of, for example, 30 data boxes ("D-boxes") in linked mode to support 30 vocabulary test questions. It is preferred that the recordings be prepared after the pilot test and any appropriate clarification of the question set.

Returning to FIG. 3, the next phase of the method is the main vocabulary testing at block 320. This trial includes presentation of the test questions to a group of subjects from the target community and collection of responses. In the preferred implementation the trial participants (preferably at least about 30, and more preferably up to 50 or more to tighten the confidence intervals of the results) call in to the platform and listen to the questions. Each question is a prompt that invites the participant to speak a response. In the preferred implementation the responses are recorded by the trial platform. In any case, the presentation of the questions and collection of responses generates the raw data to be used for semantic analysis.

Various refinements may be included in the off-line semantic analysis (blocks 325–360). After the data collection is completed at block 320, the translator may assist in isolating the words spoken and placing them in a spreadsheet so that a word frequency analysis can be performed. The translator preferably identifies words that are slang or uncommon. Normal conversations also include thought-transitioning sounds, such as interjections, conjunctions or vocalized pauses. These "non-content" words and utterances are preferably identified in the responses for each question and removed from the word frequency analysis.

The final tallies in the frequency distribution (block 325) represent the likelihood of occurrence of a word to the question or to similar questions. The candidate word selection (block 330) may employ a few basic rules for identifying preferred words based on the tallies. A word spoken by all the subjects is most certain to be the preferred word for that particular Task ("universal", as defined earlier). On the other hand, a small number of semantically equivalent responses to a question indicate no clear preference ("distributed, as defined earlier) In the latter situation the response word with best recognition accuracy is selected. When there are many different responses to a question, no preference is shown and the word is chosen to advantage the ASR engine ("uncertain", as defined earlier).

With this approach, it is possible to identify for each sub-menu command words that are both easy to use and have high recognition accuracy. When the selected words are mapped onto the anticipated menu structure of the target application (block 335 of FIG. 3), some menus may have words with acoustically similar pronunciations, or words of short length, or both. Each of these conditions will adversely impact recognizer performance, and so their effects must be reduced.

For example, a token adjective may be added to a short word, thereby reducing the potential for confusion with a similar short word in the same sub-menu. Preference may be given to a word that is more common, even though another word is semantically equivalent, which would maintain consistency with a selection for an earlier sub-menu. Occasionally a word is proposed because it is the best semantic match (closest equivalent meaning) in the target language for the command functionality.

Semantic optimization is performed off-line. First, at block 325 of FIG. 3, a frequency distribution is generated for the collected responses. An analysis is then performed on the word frequencies at block 330, which enables the selection of frequently-occurring responses as likely command words for the VA UI. The selected responses provide a preliminary, target-language vocabulary for the interface. The selected candidate words are then divided at block 335 into appropriate sub-vocabularies (compare the various menus shown in FIG. 4).

It is noted that the candidate words selected at block 330 are only likely command words for the VA UI. In fact, it is preferred that the selection procedure of block 330 include selection of alternatives to the preferred candidate words. This is because some of the selected candidate words may have acoustic similarities to other candidate words in the same sub-vocabulary.

For each sub-vocabulary, a basic acoustic analysis is performed at block 340 to quantify any acoustic similarities and to identify words that must be reviewed. An example format for the basic acoustic analysis will be presented below. If a pair of words is found to be acoustically similar (YES at block 345), then the method proceeds to block 350 where an alternative for at least one of the similar words is selected. The procedure then returns to block 340 for basic acoustic analysis of the sub-vocabulary including the substituted alternative word(s).

The subvocabularies are tested in the order of most likely frequency of usage. For the example VCVM, the Main Menu is tested first, then the End of Message Menu, then Mailbox Options Menu, etc. Each time a sub-vocabulary passes the acoustic similarity test at 345, the method advances to the next sub-vocabulary (block 355) until no more sub-vocabularies remain to be tested (block 360). This leads to definition of a final vocabulary, which is then proposed for more comprehensive acoustic analysis in view of the specific ASR engine (i.e., the speech recognizer) to be used in the VA Ul. The comprehensive analysis, in turn, validates the final vocabulary word set as satisfying the system performance criteria for recognition accuracy.

In a preferred implementation of the basic acoustic analysis (block 340), a phonetic transcription is first performed using the ARPABET representation. Common alternative pronunciations can also be included. Rules that characterize the potential types of deletion and substitution errors are applied.

In a particularly preferred embodiment, the deletion rules applied between two words may be as follows: 1=same number of syllables in a pair of words; 2=exact vowels in a pair of words; 3=exact vowel in identical syllables in a pair of words. Also, the substitution rules applied between two words in this preferred implementation may be as follows:

1=identical phonemes anywhere in the words; 2=identical phoneme in the same syllable position; 3=identical vowel in the same syllable; 4=identical vowel with the identical phoneme context; and, 5=identical phonemes and the same vowel in the same syllable. If any subvocabulary word-pair contains more than one full set of rule matches, the pair is considered a candidate for modification using alternative words determined from the initial semantic testing and analysis.

A preferred enhancement of the basic approach is to tune the final vocabulary to the target language and the target service application. In this procedure, consistency of usage throughout the UI may be considered for both grammatical forms and phrase structures. For example, candidate words may be considered to describe actions which can be taken to manage a group list in the example VCVM application. In this situation it may happen that the frequency analysis (block 325) reveals no strong preference among the test subjects for words to be used.

In this example situation it is possible that a word choice translating literally to "group list" or "options list" may be passed over in favor of a word meaning "distribution list." One reason for the latter choice would be to maintain semantic equivalence with the English language counterpart. Similarly, a command may be modified to a different verb form (viz., progressive tense vs. infinitive) to maintain consistent usage of verb forms (action words) where possible.

Some words may be specific to the application and have no clear counterpart in the target language. In such cases, command words may be selected as those commonly understood, even though semantic equivalence to the functionality being named is less than perfect. Article adjectives may be added when the impact on the length of the transaction is slight compared to the amount of clarity or user friendliness it added. In some languages, adding a particular article may make the actual utterance longer and hence more attractive for an interrupt word.

Using the same word across multiple menus reduces the cognitive load on the user, because the word then refers the same concept and consequently leverages the user's comprehension and learning from an earlier menu state into later states. For example, using a word as a command to enter a menu and then having the same word announced (in echo) as the name of that menu is considerable positive reinforcement to the user. Similarly, parallelism may be used advantageously to reinforce similarities between objects of commands. For example, a word used to name the primary fax telephone number may indicate in one menu that the digits are to be entered, while in another menu the same word may indicate that the number is being used for message transfer.

Syntactic Structure

Returning to FIG. 2, the second design track (which can proceed in parallel with the semantic analysis outlined above) is to identify an effective syntax. The present invention provides a method for defining a formal structure (called a "syntax") that includes the temporal rules and prompting manner to be used in the VA UI. Here a "syntax" for a VA UI is defined to be a structure for sequential presentation of spoken information defined by a set of rules. A conversational syntax may be implemented in a VA UI for a target service and a target language by specifying a prompt structure according to a set of grammatical rules. The components of the structure include context cues (e.g., menu labels), carrier phrases (explicit or implicit), slots (places) for words, intervals for pauses between words and phrases, intonation contours for words and phrases, and other prosodic features.

The existing approaches to VA UI design have failed to recognize that improved VA UI performance can be realized by identifying and taking advantage of those areas where the verbal modality of dialogue differs from the written modality in the element of time. An effective VA UI must prompt the user in a manner that both provides easy-to-understand information for response and also must signal when it is time for the user to respond with commonly used command words. Recognition of these requirements leads to a framework within which to consider and implement cues for "turn-taking," that is, grammatical and temporal indications that a unit of information has been conveyed and an opportunity for response will follow.

Any baseline syntax may be constructed with tokens (words) having some semantic applicability to the service. However, syntactic parameters are more accurately specified for a target language if the semantic content is chosen as described above, so as not to add additional cognitive load to the user who is intended to react to manner in which the message provided by the baseline syntax. Optimization of the UI in view of this coupling is described below. For a specific language, the temporal structure (the syntax) itself requires specification of pace, pauses, intonational cues, and means to present information "chunks" (e.g., groups of options). Every language and culture follows some conversational universals, but speed of presentation, length of turn-taking pauses, and clause (e.g., chunk) intonation all vary in different degrees between specific languages. Pauses are significant for at least two reasons: they mark out the boundaries of informational chunks, by highlighting beginning and ending, and they signal turn-taking positions in the dialogue.

The method provided by the invention for optimizing syntax may be implemented with a specialized simulation environment in which the simulator performs perfect speech recognition. This approach is preferred because signal recognition issues (ASR) can be thereby decoupled from the user interface issues posed by the prompting structure. One desirable platform for such simulations is VISIO Professional and Technical 5.0 by VISIO Corp., of Seattle, Wash. Another simulation tool with excellent features is Unisys Natural Language Speech Assistant 4.0 by Unisys Corp., of Malvern, Pa.

The test prompts of the service provide the information to complete the tasks and to achieve the goal. Non-service specific tasks are also presented if they embody a prompt structure similar to the specific service, so as to de-couple service dependence while addressing the spoken syntax of the target language and culture. Turn-taking locations, content of the verbal information, rate of presentation, grouping of options, and pause durations are implicit cues given to the subscriber by the test prompts.

Figure 6:
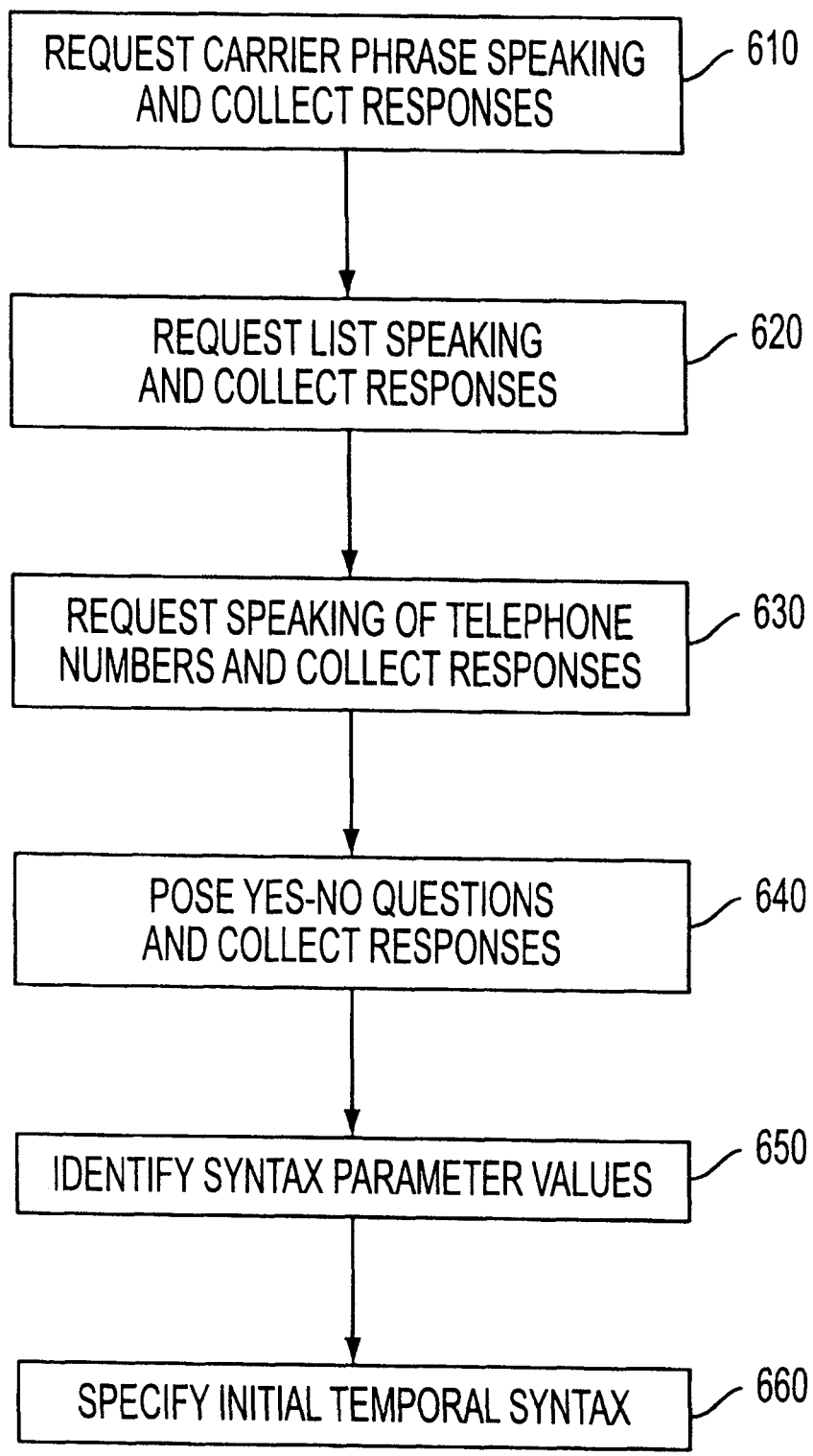
FIG. 6 shows a flow diagram illustrating a method of selecting an initial temporal syntax as provided by the present invention.

FIG. 6 shows a flow diagram for a method of the invention for identifying an initial temporal syntax identification. The illustrated method permits modification of parameters in order to accommodate language dependencies. At blocks 610–640, samples of dialogue are collected relating to service tasks for the target application. In a preferred implementation, tasks are posed for achieving a set of service-specific goals.

In a particularly preferred embodiment, as illustrated in FIG. 6, the subjects are requested to perform several tasks calling for spoken responses. Different speaking tasks may emphasize different parameters for the temporal dimension of spoken dialogue in the target language. The purpose of these tasks generally is to generate (for capture and analysis)

samples of conversational speech containing phrase parts or other speech elements from the target language that contain temporal features that contribute to clear, concise dialogue. It is preferable that several versions of each speaking task be performed by each of a group of subjects (10 to 50 or more). Larger numbers of versions for each task and larger numbers of subjects will tend to yield more accurate initial estimates of the optimal values for the speech parameters of interest in the target language.

At block 610 of FIG. 6, the task is to respond to an open-ended question with a suitable sentence that should contain a carrier phrase, such as (in English) "How would you request someone's telephone number?" or, "How would you say that you didn't hear the telephone number?" Samples of such statements provide initial estimates for overall pace and rate of presentation in a comfortable yet effective dialogue in the target language.

At block 620, the target task is to recite a list of items, generally having greater than 5 items, in response to an open ended question such as "Say the colors of the rainbow." Each response by a test subject is a spoken recitation of a list and provides sample data containing durations and locations of pauses in such a spoken list in the target language. It is preferable that several different lists having various numbers of commonly known items (e.g., fruits, trees, cities) be requested from each subject. The request prompts may be written or spoken. Spoken prompts are preferred so as to promote spontaneous and natural speech patterns. If written, the request prompts may use different punctuation between the list items (e.g., items separated by commas, or semicolons) to test for context variations that affect the manner in which such lists are spoken. The request prompts for different lists are preferably interspersed with each other and with request prompts for other tasks ("shuffled") to test for inter-recitation dependencies.

The target task of block 630 is to have test subjects say a telephone number. It is preferable that responses are collected to open ended questions such as "Please say your office telephone number." Alternatively, or in addition, the subjects may be requested to recite currency amounts or other numerical quantities that may be used in typical conversations in the target language. Further, at block 640, the subjects are presented with sentences that contain a question probing for a yes/no format (e.g., "What would you say to someone if you're not sure whether they said yes or no?"). The spoken responses provided for each of blocks 610–640 are collected (e.g., recorded) for analysis.

The task requests of blocks 610–640 are considered to provide particularly preferred procedures for effectively identifying the primitive, temporal "phrase") parts of the types of "sentences" in the target language that are likely to be spoken in a dialogue with the VA UI. The temporal components of such questions provide the initial parameter values that are specified in the initial temporal syntax.

At block 640, based on the response of the key variables, desirable values of the syntax parameters are identified. A consistent set of the desirable parameter values is selected at block 650, whereby the initial syntax is specified.

Integration and Optimization

Again returning to FIG. 2, the prompts used by the service (i.e., the outputs from the VA UI to the subscriber) are preferably tested again at block 70 after being integrated with the final vocabulary set. The combined syntax and semantics, now adapted for the target language, can then be optimized at block 80. The objective of this joint optimization is to ensure that each prompt of the syntax structure reliably elicits from the subscriber a spoken command included in the words of the relevant sub-vocabulary wordset.

As in the procedure for selecting an initial syntax, the prompts are preferably tested in the entire service task domain to ensure appropriate interpretation by the subscriber. The subjects are tested using the language-specific temporal syntax to verify that, for the entire service, functions are reliably executed in the easiest and most efficient manner. Similar to the protocol for selecting the initial syntax, the subjects may be asked to complete several realistic tasks that exercise all major call paths of the service. The tests may be videotaped for subsequent review and quantification of results in areas where performance may be improved.

The preferred prompt testing for dialogue sample collection may be implemented by the following protocol. A "session" is a service interaction where a user is directed to achieve specific tasks, works to complete tasks, and receives a questionnaire for comments on how well the syntax helped complete the tasks. Subjects are usually videotaped for later review. After completion of a set of tasks, relevant variables are measured and performance values determined. Questionnaires may be analyzed for additional information.

A task set is preferably composed of two tasks, one performed after the other, with the first task testing basic functions and enabling learning to take place. The second task is more complex and allows measurement of learning effects. Each task may be composed of a set of from 2 to 6 subtasks. The subtasks in Table 1 below are typical of activities required in the exemplary VCVM service:

TABLE 1

| Sub-task | Description |
| --- | --- |
| 1. | Review messages and save or delete them, if the name and telephone number is present. |
| 2. | Transfer a specific message to another mailbox. |
| 3. | Change the greeting. |
| 4. | Change the passcode. |
| 5. | Review messages in linked-listen mode. |
| 6. | Speak a "wake-up" word to interrupt playback of a message. |
| 7. | Correct a small number of simulated speech recognition errors. |

Key variables (performance indicators) are preferably tracked through each testing session. Identifying how these variables change in different conditions determines parameter settings for best overall system performance. A preferred set of key variables to be tracked in the testing sessions is set forth in Table 2 below. The key variables relevant to initial syntax identification are primarily those of the first category, for user interface issues. Key variables of the second category (for ASR issues) may also be tracked in the testing and are relevant at later stages of the VA UI development process.

TABLE 2

| User Interface | ASR Technology |
| --- | --- |
| Task duration measures the amount of time has spent attempting to achieve the goal(s). It excludes time spent listening to messages, a greeting or a passcode. | Rejection rates and recovery from rejections are monitored. |

TABLE 2-continued

| User Interface | ASR Technology |
| --- | --- |
| The barge-in location and frequency is tracked. Barge-in indicates sufficient information for a decision, and turn-taking. These areas are improved by refining turn-taking cues, and providing better collateral materials or on-line tutorials. | ASR Error Type and location are logged. A user may mis-speak, have a bad accent, say the wrong word, or background noise become too loud. Analysis indicates whether ASR technology needs re-tuning, parameter resetting, or a speaker fault occurred. |
| Throughput rates (successfully completion the transaction) measures task completion. Error handling is examined at points of failure. Interviews are performed during and after any taskset to identify specific points of trouble with the service, what the user was trying to do, and how they failed. | OVW frequency and location responses is tracked to determine that the rejected words can logically be used as responses. The location of yes/no questions, and the responses are tracked. A yes/no question impacts throughput. Yes/no questions may also indicate that the recognizer is having trouble. Synonyms for yes or no responses are tracked, and even captured so these words may be supported. |
| Questionnaires measure satisfaction, and potential problem areas and user needs. Surveys provide direct information from users and a means to track trends in satisfaction. | |

Depending on the degree of development of the service (software and hardware availability) testing may be performed by a simulation (in vitro). The simulation environment (also called a Wizard of Oz, or "WOZ" simulation) decouples the ASR technology from the VA UI. This means that the simulator (the "wizard") acts as a perfect recognizer, thereby focusing the subject on only task-specific actions toward achieving the application goals. Preferably the simulator allows ASR errors to be injected into the simulation at later stages, in order to observe user actions and to test UI support of error handling. Such testing with controlled ASR errors helps to ensure that the user will be brought back into a successful service execution path when an error occurs in the deployed system. A simulation wizard may be used, as described above with respect to syntax optimization. Alternatively, testing may be performed on a trial platform (in vivo) that includes ASR technology and couples ASR performance back into the service.

In either case, it is preferred that a small number of volunteers (10–15 subjects) be tested to identify any difficulties. The tests are videotaped for subsequent review and a quantification of areas of syntactic and semantic performance shortcomings. Tests to determine the values of syntactic parameters are posed to a set of subjects interacting with the service through a set of service-specific goals where the prompts of the service provide sufficient information to complete the tasks to achieve the goal. Turn-taking locations, content of the verbal information, rate of presentation, grouping of options, and pause durations are implicit cues given to the subscriber. The values of these parameters are varied through the tests in order to improve performance in the person-machine VA UI for the target language as used by the target community. Often, competing prompting grammars are tested to isolate the effects of syntactic changes.

Adaptive Prompting Method

The present invention also provides a new and unique syntactic structure that actually turns to advantage the temporal limitations of voice activated services. Heretofore, all UIs have utilized a simple, serial syntax in which options are stated iteratively, one at a time, and responses are requested only one at time. The present invention utilizes a syntactic structure that supports presentation of a small set of multiple (parallel) options, from which the user can select a desired choice by saying the corresponding command word from the current context at any time.

The invention provides a general syntactic structure (or "temporal template") that includes combining temporal and grammatical cues to signal those points where turn-taking is expected to occur. The speech recognizer can be active at all times, so the subscriber may actually speak at any time. However, the template increases the accuracy of the ASR technology, as well as permits identifying and taking advantage of the resource's duty cycle, by predicting speech inputs by the user at specific time intervals through use of turn-taking cues.

Figures 7A, 7B:
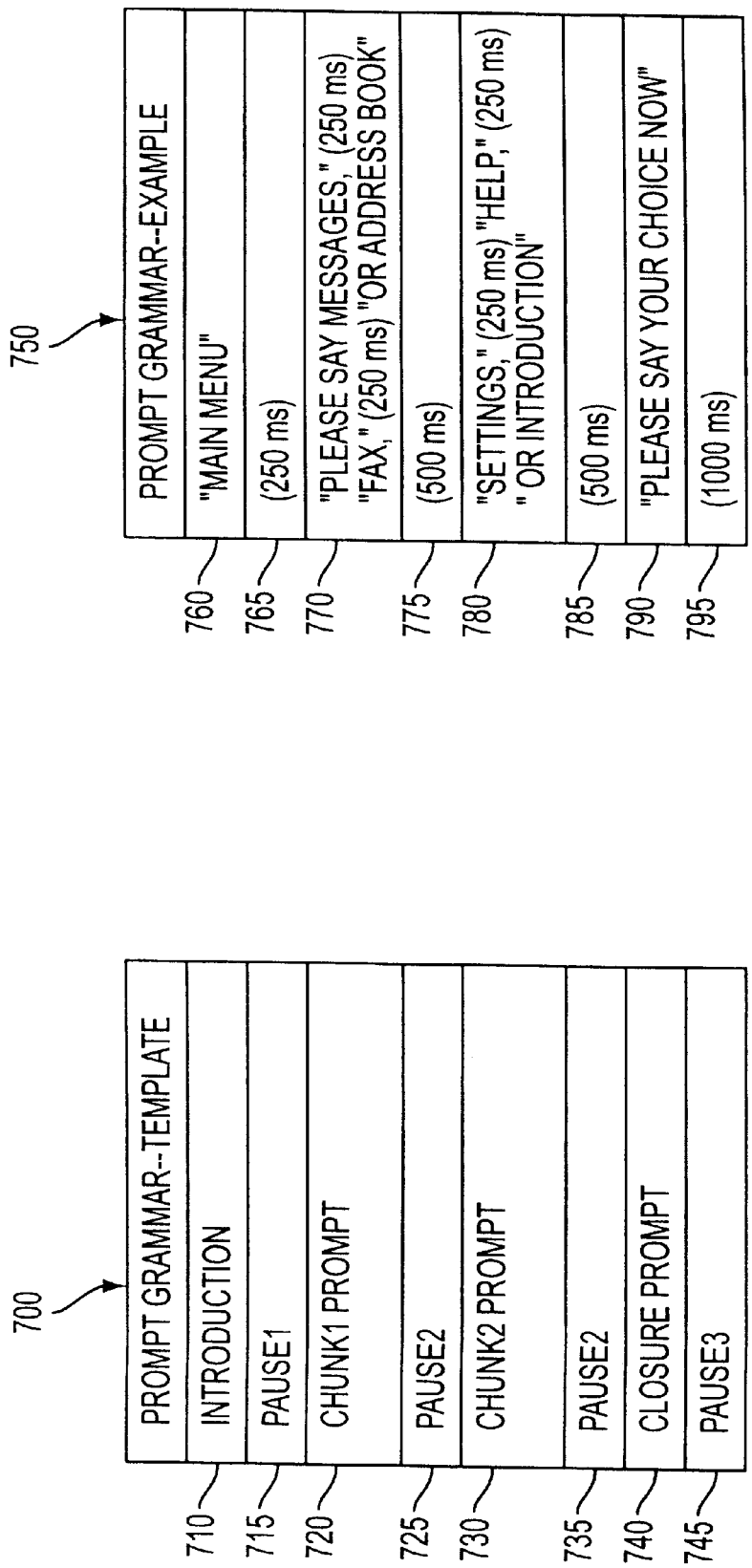
FIGS. 7A and 7B respectively show a template of a prompt grammar provided by an aspect of the present invention and an example prompt grammar for the illustrated template.

FIG. 7A illustrates a preferred prompt grammar template 700 as provided by the invention. The template begins with a short, spoken Introductory Label 710 (such as a menu name) which is designed to orient the listener. The label 710 provides a navigational cue (context) as to where the subscriber is in the overall menu structure, and to advanced user, an association with the permitted responses. A first pause 715 is then provided of length Pause1, to allow a short interval where a response may be spoken without hearing any of the available choices of that menu. Pause 715, which will be called a "carrier phrase pause," is used by advanced subscribers of the service who know what they want to choose at this point. The pause length Pause1, however, is not long enough to disrupt the dialogue. These culturally dependent pauses are determined by the syntactic tests described earlier.

The grammar template 700 then breaks the set of menu selections into conceptual "chunks" of between 2 and 4 choices presented as a group. This grouping of choices improves the usability of the resulting VA UI by calling into service the user's capacity for parallel association. The preferred chunk size (2–4 choices) provides a small amount of information upon which action can be taken as well as not overload auditory short term memory.

A first prompting chunk 720 begins with a short carrier phrase (e.g., "You may say . . . ," or "Say . . . ,"), then a first group of response options Chunk1 is spoken by the service. It is preferred that the group of choices for Chunk1 includes the rank-ordered, most frequently used commands for the current menu. The pacing and intonation of the chunk is typical for the target language, generally with a slight falling inflection at the end of the last word to signal a grammatical break and an opportunity to respond.

A second pause 725 of length Pause2 is then provided for a response by the user. It is preferred that the pause duration Pause2 be longer than Pause1 and of sufficient time length to enable cognitive (decision making) processing and to provide reaction time for the user to select an option from the current chunk. Pause 725 is an implicit (syntactic) signal at a conceptual (semantic) boundary that indicates the listener may take a turn and speak. Both the falling intonation and Pause2 signal that this is a turn-taking event.

If no response is made by the subscriber, the syntax specifies that a second prompting chunk 730 be spoken by the service to present a second group Chunk2 of response options. Chunk2 preferably includes the next most frequent set of choices, after the choices offered in Chunk1. Although grammar template 700 as illustrated in FIG. 7A includes only two prompting chunks 720 and 730, it will be apparent to those skilled in the art that as many such prompting chunks may be provided as are needed to present the current menu options. All of the alternatives in the menu are eventually covered in this manner, so that the subscribers eventually hear all available options.

It is preferable for the UI to be able to make available all menu specific options at any time. General choices (cancel, help, Main Menu, for example) are preferably unstated but always available, and words from other menus may be accepted whereby the user may directly "jump" to another menu. However, a prompting structure implementing the template encourages selection from specific chunks of options at each of the pauses 725, 735, etc. This preferential prompting has the additional advantage of allowing greater emphasis on recognition of the response options offered in the preceding prompting chunk (chunk 720 for pause 725, chunk 730 for pause 725, and so forth). This feature increases the likelihood of successful recognition for the response options most likely to be chosen at each pause.

After all options are proposed, a closure prompt 740 is spoken to indicate that all choices have been provided and a choice should be made ("please say your choice now"). This is an explicit verbal signal for turn-taking. A final pause 745 of duration Pause3 is then provided to signify yet another turn-taking boundary before the system initiates an alternative prompting style. It is preferably that Pause3 is slightly longer than Pause2, to provide more time for new users to make a final decision.

FIG. 7B provides an example prompt grammar 750 as provided by the invention and following the prompt grammar template 700. In the prompt grammar 750 an introductory segment 760 has verbal content "Main Menu" and corresponds to the Introductory Label 710 of the grammar template 700. A pause 765 corresponds to pause 715 of the template 700 and has a duration (Pause1) of 250 milliseconds (ms). A prompting chunk 770 includes an carrier phrase "Please say . . . ," followed by a first chunk of options "Messages, Fax or Address Book." A second pause 775, of duration 500 ms (Pause2), is followed by a second prompting chunk 780 providing the options "Settings, Help or Introduction."

It is noted that FIG. 7B shows additional detail for the illustrated prompt grammar by indicating the presence of pauses (of duration 250 ms, in this example) between the individual list items in each prompt chunk. These so-called "intrachunk pauses" are natural separation intervals between successive items in a spoken list. It has been found that the most effective duration for such an intrachunk pause is culturally dependent and thus is desirably adjusted when designing a VA UI for a given target community. The intrachunk pauses demark the boundaries between successive list items, just as the "interchunk pauses" 775, 785, and so forth, demark the boundaries between successive chunks of information.

It is noted that the second prompting chunk 780 omits the carrier phrase ("Please say . . . ") that was provided with the first prompting chunk 770. However, this arrangement is not essential to the prompt grammar of the invention. For example, alternative embodiment can use a suitable carrier phrase for the second and subsequent prompting chunks.

The example prompt grammar 750 follows the second prompting chunk 780 by a second pause 785, where again the duration Pause2 in this example is 500 ms. A closure prompt 790 contains verbal content urging the user to select an option: "Please say your choice now." Closure prompt 790 is followed by a third pause 795, which in this example is much longer than the pauses 775 and 785, or in this case 1000 ms.

Figure 8:
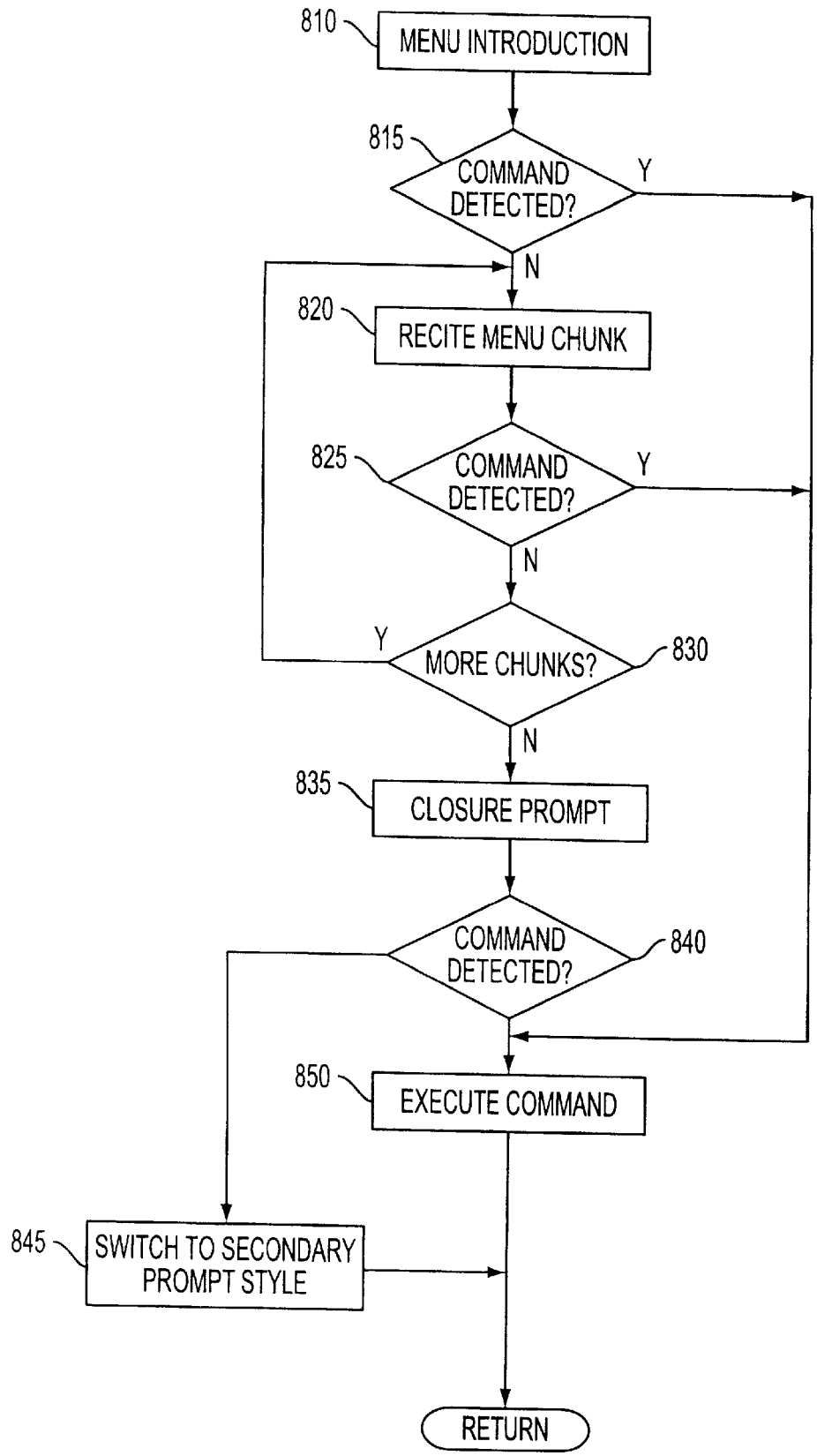
FIG. 8 shows a flow diagram illustrating a prompting method provided by the present invention.

FIG. 8 illustrates a flow diagram for a VA UI prompting method provided by the invention and corresponding to the prompt grammar template 700. The introducuction, such as a name or descriptive title of a current menu, is announced to the user at block 810. The UI determines at block 815 whether a recognizable command is received during the pause 715 following the introduction. If pause 715 passes without a response, then the method proceeds to block 820 where a prompting chunk for the current menu is recited. Block 825 determines whether a command is received during the second pause that follows the prompting chunk of lock 820. If no response is detected at block 825, the method tests at block 830 whether any more prompting chunks remain to be recited. If so, then the method returns to block 820 and the next prompting chunk is recited.

If it is determined at block 830 that no more prompting chunks remain, then the method proceeds to the closure prompt at block 835. A further test is performed at block 840 to determine whether a response has been received. The method then preferably switches to an alternative prompting style at block 845 and returns control of the device. Another syntactic template may include a counter in block 845 to repeat the prompting sequence starting at 815 one or more times. If any of the response detection queries 815, 825, and 840 indicate that a suitable command has been received, then the method proceeds directly to execution of the detected response at page 850 and returns.

Figure 9:
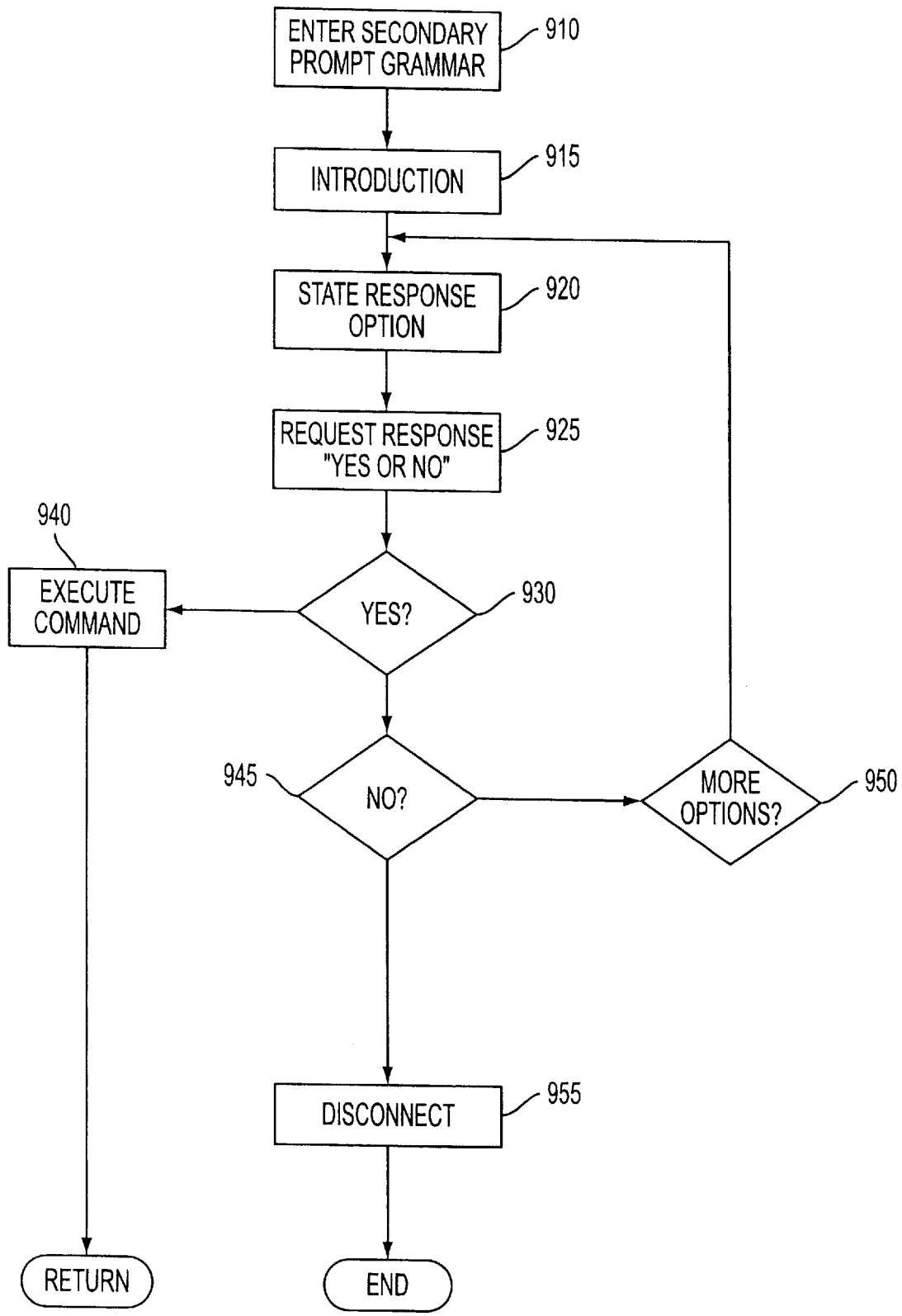
FIG. 9 shows a flow diagram illustrating a secondary prompting structure provided by the present invention.

FIG. 9 illustrates a flow diagram for an alternative prompting method as provided by the invention. A method of this aspect of the invention may begin at block 910 by entering a secondary prompt grammar, which in the preferred case occurs when prompting by the primary grammar fails to elicit a suitable response.

The alternative prompting style illustrated in FIG. 9 is generally targeted for new users and is provided if no action is taken after the closure prompt at block 835 of FIG. 8. Preferably this is a final prompt style that exhaustively iterates each individual choice, one at a time, posed in a yes/no context. A further introduction to use of the system may be presented, as shown by block 915, which inform the user that this prompting syntax requires a response or the system will terminate the entire session. The goal is to forceably evoke a very simple response from those users who are still not sure what to do, yet have heard all the available options and have not yet responded. Turn-taking is explicit and forced: a response option is presented at block 920, and a response request ("yes or no") is stated at block 925. At block 930 it is determined whether the user has answered "yes." If so, then the method proceeds with processing the approved option and returns.

If a "yes" response is not detected at block 930, then at block 945 it is determined whether the user has responded with "no." In one version of the method, if a "no" response has been received at block 945, then it is determined at block 950 whether more response options exist to be offered in the yes/no format. The method returns to block 920 from block 950 if there are more options. If no further options are found at block 950, or if no response from the user is detected at block 945, then the method disconnects the user from the service at block 955 and exits. Alternatively, the method may augment a test procedure corresponding to block 945, wherein no spoken response is taken to implicitly mean a spoken "no" response and propose the available options in order until all options are determined to be exhausted by block 950.

The alternative prompting method of FIG. 8 is more efficient and easier to use than the method illustrated in FIG.

9, because the former allows the user to dynamically take control of the dialogue. The explicit, forced turn-taking of the alternative method is desirable only in a limited set of situations, such as when the user is unprepared or hesitant to share control with the UI. Explicit, forced turn-taking can also be useful for handling errors, as discussed in the next section.

Adaptive Error Handling

Any VA UI must address two issues: successfully accomplishing a service supported task, and error handling of system or subscriber mistakes. Successful tasks are achieved by the subscriber saying the right words at the right time, hence by speaking valid "sentences" as determined by the syntax and semantic of the VA UI. The means for success were discussed above. The key measurement in this regard is the number of operations required to achieve the goal and the task duration.

On the other hand, over many users, errors will inevitably occur. It is therefore highly desirable for a practical VA UI to include a consistent mechanism to handle errors. There are two types of VA UI failures: system and user. System errors are generally attributable to ASR errors, which often arise from microphone misplacement, spurious background noises, and user hesitations ("er", "uh").

User errors result from many reasons: didn't hear the prompt, misheard the prompt, said the wrong word, mispronounced a word, changed your mind, background sound was interpreted as a word, etc. The framework of syntax and semantics, as provided by the present invention, also applies to user errors. In particular, a further aspect of the invention provides for decoupling user errors from system errors and testing the user errors through the service simulation. This enables generation and analysis of UI results relating specifically to the user errors. The analysis can be looped back into the UI design process to provide further robustness against user errors and actions to remedy the errors.

User errors are generally attributable to two types of causes: misleading or incorrect prompts, and the user's reliance on an improper mental model of the service. The PI goal is to minimize errors that are preventable (minimize number of operations) and to resolve errors as efficiently and quickly as possible (minimize task time).

The invention provides error handling methods in which two main user error treatments are decoupled: treatment for errors of omission (no response), and treatment for errors of commission (incorrect response). Error detection is measured by changes in the behavior of the individual. A confused subject normally exhibits increased reaction time before any new action is taken, or produces non-task related speech (OVWs, interjections, "thinking out loud"). Latency time leads to determining timing thresholds that may trigger a "help" command.

Error correction is generally performed by speaking conceptually equivalent recovery words, such as "back-up", "undo", "Main Menu" or "cancel." This results in the subject being moved backwards to the previous state or back to the start. The subject then solves the task from this new state. Different prompts may be given based on the degree of subject confusion: longer, more explicit prompts for subscribers having more trouble as measured by repeated errors, repetition of successful tasks or ongoing latency between spoken choices.

Errors of omission occur when the user provides no response when expected. These errors are considered to arise from syntactical failures and are addressed by reprompting with an alternate prompting structure having a simpler syntactical component. Error handling is performed by a time-out treatment that builds on the syntactic (temporal) cues, followed by reprompt, followed by eventual disconnection if no response occurs. A primary prompting syntax may be repeated. A second, more structured syntax with more clarification given in each prompt choice may be provided if the omission error continues.

Figure 10:
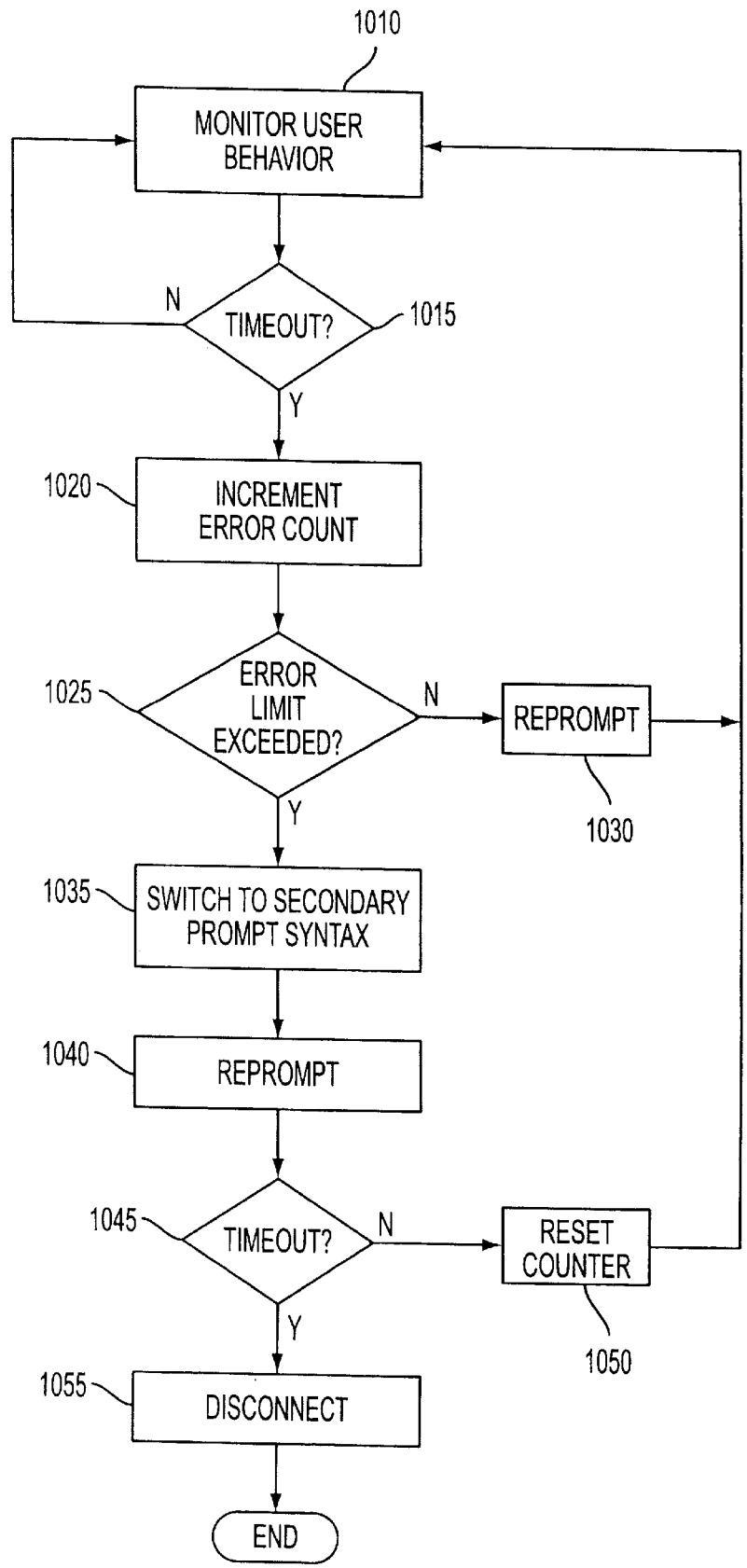
FIG. 10 shows a flow diagram illustrating an error handling method provided by the present invention.

FIG. 10 illustrates an aspect of the invention providing a method for handling errors of omission. A monitoring process, which may be carried out in background, is performed at block 1010 to detect changes in the user's behavior responsive to prompts from the interface. At block 1015 it is determined whether the user has delayed providing a response beyond a predetermined timeout interval. As long as no timeout occurs, the monitoring merely continues.

If a timeout is detected ("yes" at block 1015), then an omission error is determined to have occurred and the method advances to block 1020 where an error counter is incremented. Block 1025 determines whether a predetermined error limit has been exceeded. If not, then the user is reprompted at block 1030 and monitoring continues at block 1010. For example, as noted above, the user may be given another opportunity to respond appropriately from within the primary prompting structure. In this case the error limit may be a local limit, indicating a limit for errors since the last prompt. Other types of error limits are possible also, such as a limit referencing the total number of errors that have occurred in a given dialogue session.

If the appropriate error limit has been exceeded ("yes" at block 1025), then the illustrated method proceeds to block 1035 where a secondary prompting syntax is adopted. For example, a prompting method as illustrated in FIG. 9 may be employed. At block 1040 the user is reprompted based on the secondary prompting structure. Timeout is again checked at block 1045. If the user provides an appropriate response within the applicable timeout limit (which may be different from the timeout limit applied at block 1015), then the method proceeds to block 1050 where the error counter is reset. If the error limit is other than the local limit noted above, then block 1050 may be omitted or relocated. Following block 1050, or upon a "no" determination at block 1045, the method returns to monitoring at block 1010.

If the user again fails to provide a response within the applicable timeout limit ("yes" at block 1045), then the method proceeds to block 1055 where the user is disconnected from the service. This sequence parallels the "no" determination from block 945 in FIG. 9 with flow proceeding to disconnection at block 955.

Commission errors occur when the user provides an incorrect response, such as providing a recognized word that performs an undesired command, or when an appropriate word is recognized as an "out of the vocabulary" word (OVW). Such errors tend to arise from semantic failures and are addressed by "second chances" and error correction options.

Figure 11:
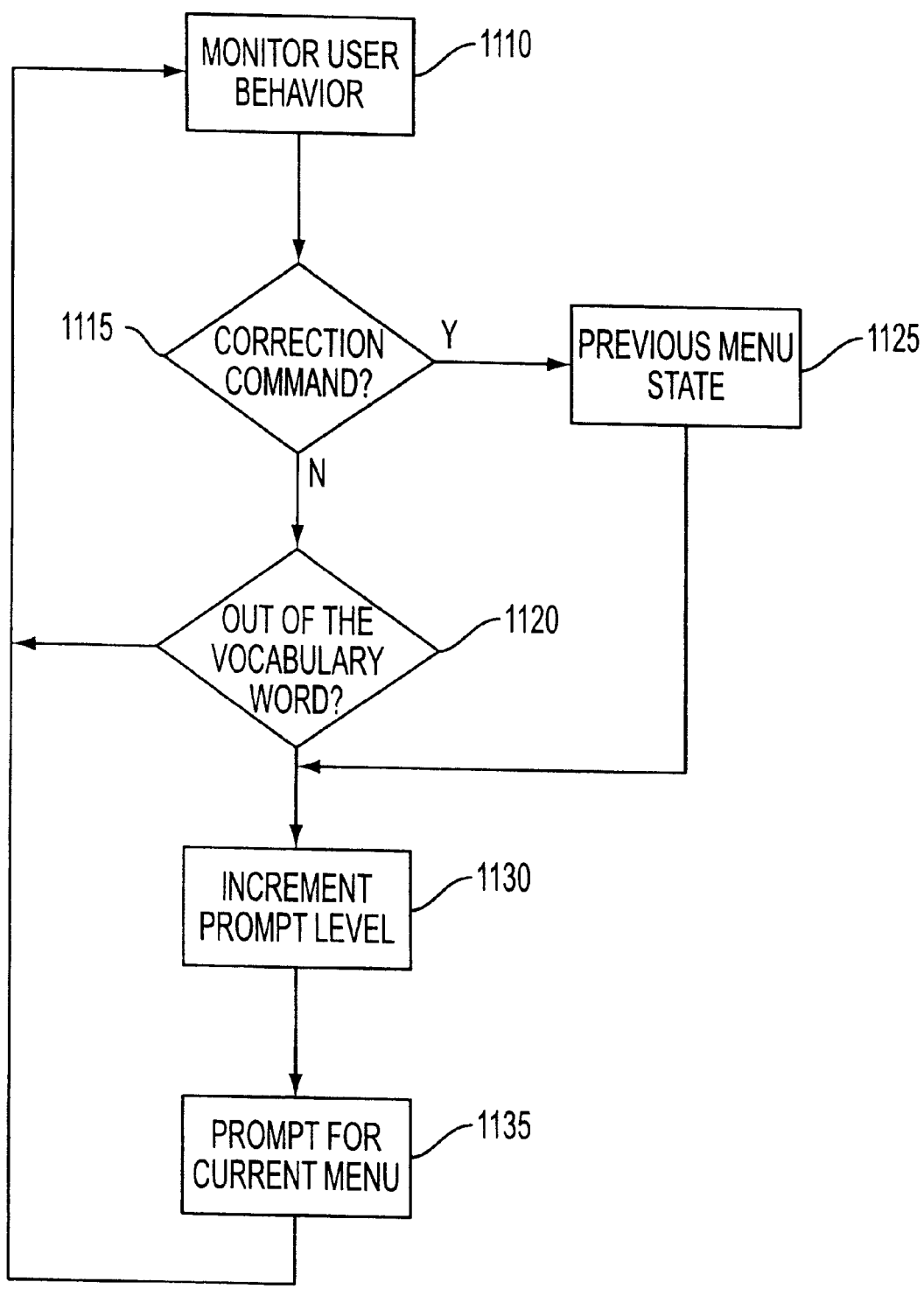
FIG. 11 shows a flow diagram illustrating another error handling method provided by the present invention.

FIG. 11 illustrates a method of the invention for handling commission errors. A monitoring procedure at block 1110 parallels the monitoring procedure of block 1010 in FIG. 10. At block 1115 it is determined whether the user has said a command word for a correction command. If not, then it is determined at block 1120 whether a response by the user is an OVW. If an OVW is not detected at block 1120, then the method returns to the monitoring procedure at block 1110.

If a correction command is detected ("yes" at block 1115), then the user is returned to a previous menu state at block 1125. For example, the VA UI may provide the word "main menu" as an escape command by which the user can back out to the main menu from any of the submenus. See, for example, the submenus shown in the example subvocabulary specification of FIG. 4. If the user says "main menu" from within a submenu, then the VA UI returns the menu state to the main menu and the user can try again to perform the desired task.

Handling of commission errors by the invention may include simply returning to the monitoring state after a correction command has been executed. However, the method illustrated in FIG. 11 includes the optional feature of incrementing a prompt level at block 1130 following menu-state return at block 1125. Error prompt levels will be discussed below with reference to FIG. 12. After incrementing the prompt level at block 1130, the method of FIG. 11 proceeds to block 1135 where the user is prompted for the current menu based on the current prompt level. The flow then returns to the monitoring state at block 1110.

Figure 12:
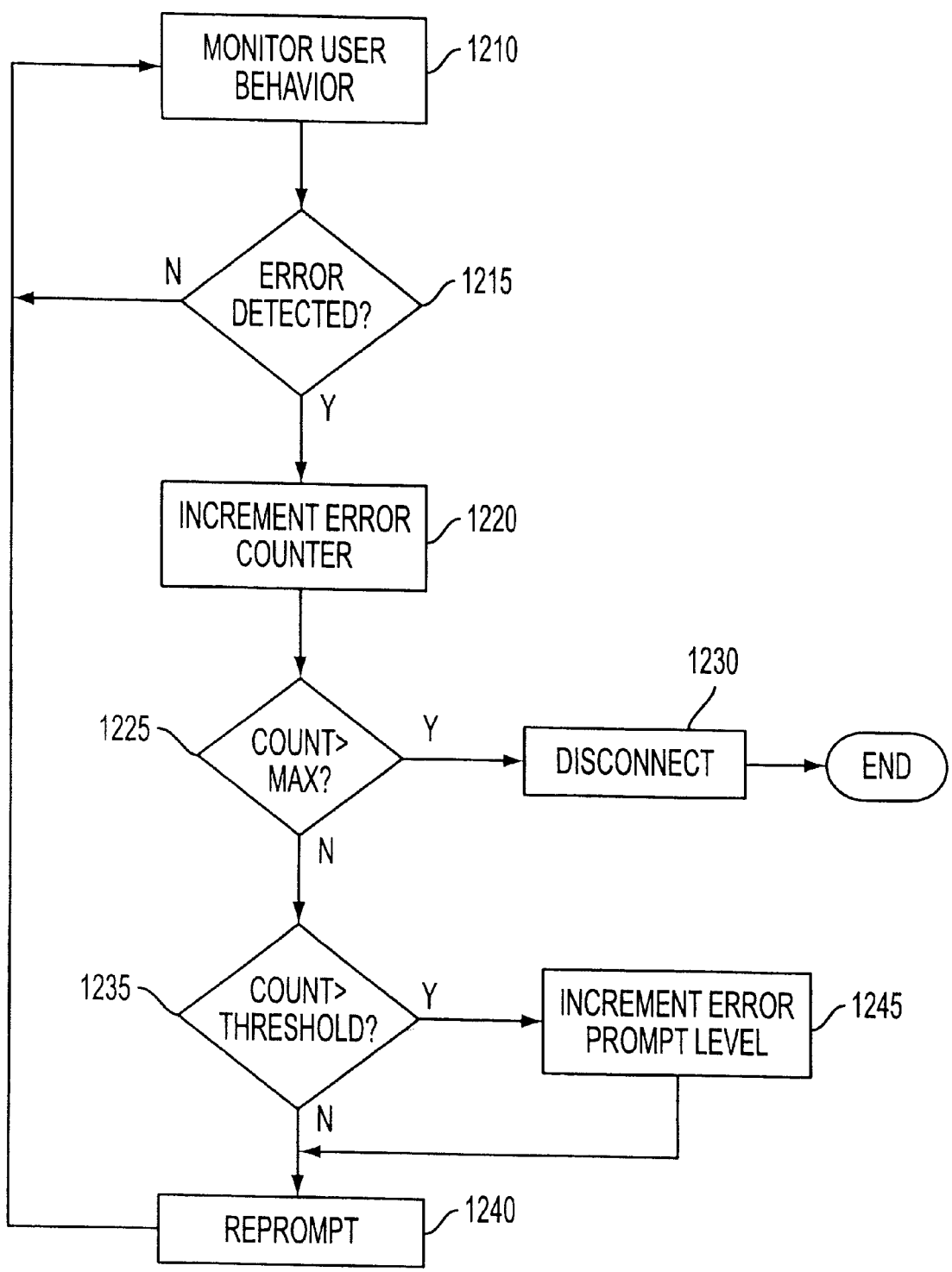
FIG. 12 shows a flow diagram illustrating a method for adaptive prompting levels as provided by the present invention.

FIG. 12 illustrates an exemplary implementation of error prompt levels as provided by the invention. A procedure for monitoring the user's behavior is again carried out at block 1210. At block 1215 it is determined whether a user error has occurred. The error prompt levels provided by this aspect of the invention may be implemented with either omission error handling, or commission error handling, or both. If no error is detected, then the method continues monitoring at block 1210.

If an error is detected ("yes" at block 1215), then the method increments an error counter at block 1220. In the illustrated example, it is determined at block 1225 whether the error count exceeds a limit MAX. If so, then the VA UI disconnects the user from the service at block 1230. For example, the user may be disconnected if repeated prompting fails to elicit an appropriate response.

If the error limit has not been exceeded ("no" at block 1225), then the method proceeds to block 1235 where it is determined whether the error count is greater than a threshold value. In the example illustrated in FIG. 12, threshold=1. If the error threshold has not been exceeded at the current prompt level, then the method maintains the current prompt level, reprompts the user at block 1240, and returns to the monitoring procedure at block 1210.

If the error threshold has been exceeded ("yes" at block 1235), then the illustrated method advances to block 1245 where the error prompt level is incremented. The operation of block 1245 thus parallels the operation of block 1130 in the method illustrated in FIG. 11.

As indicated by FIGS. 11 and 12, a preferred embodiment of the invention provides plural error prompt levels. The invention may provide two or more prompting structures that together implement the use of more clarifying prompts at each of successive stages of user difficulty. An error counter, such as a local counter, a transaction counter, or a personal profile counter, keeps track of the number of errors which have occurred over a time interval, and lets the system take different action for different levels of error. For example, the UI may change the prompt wording to add more clarification, or break the task into simpler subtasks, or (the simplest prompt structure) pose a highly structured prompt to be answered by a yes or no response.

Figure 13:
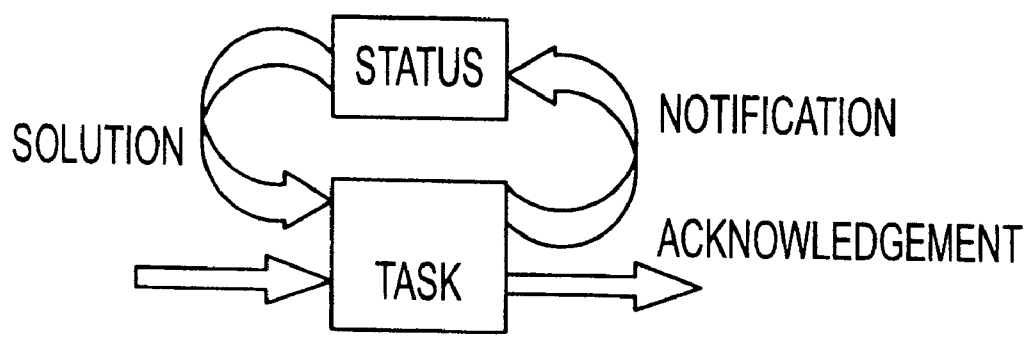
FIG. 13 shows a block diagram illustrating a general error handling procedure of the present invention.

FIG. 13 shows a functional diagram of a standard form for system-wide error handling procedures in a preferred embodiment of the invention. A three-part procedure is followed that includes stages of notification, status, and solution. Notification can be null, non-verbal (longer silence, or an error tone sequence), or verbal (for example, "sorry"). This sets the context to indicate that an error has been detected by the system.

The status describes the type of error made (for example, "the telephone number is not correct"). Preferably this information is omitted for one-step tasks, because in such situations the type of error that has occurred is merely reiterated (e.g., "you have entered 708-555- 1212"). The solution stage explains what may be done or should be done to correctly perform the task (for example, "you must enter a ten digit telephone number").

The syntax of error handling is the sequence of operations and pauses between the operations executed (some operations may be omitted). The semantics of error handling incorporates the words and sentences provided as feedback to the subscriber. Thus, the error handling semantics may depend on the nature of a persona attributed to the service at a specific prompting level.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method for designing a voice activated user interface, the method comprising:
   separately selecting a vocabulary set and a prompting syntax for the user interface based on semantics and syntax determined by results of first testing with subjects from a target community; and
   jointly optimizing the vocabulary set and the prompting syntax based on results of second testing with subjects from the target community.

2. A method as recited in claim 1, wherein selecting the vocabulary set comprises selecting frequently used words for commands of a target service application based on frequencies of occurrence generated for the words from the first testing results.

3. A method as recited in claim 1, further comprising obtaining the first testing results by a procedure including:
   posing task-oriented questions to the subjects and collecting responses therefor; and
   generating a frequency distribution for the collected responses.

4. A method as recited in claim 1, wherein selecting the prompting syntax includes:
   identifying an initial value for each of one or more syntax parameters from samples of spoken dialogue in a conversational language of a target community; and
   specifying an initial temporal syntax for the user interface based on the one or more identified initial values.

5. A method as recited in claim 1, further comprising obtaining the first testing results by a procedure including:
   posing a task set for a subject to perform using the test prompts; and
   collecting dialogue information for the test prompts when the subject performs the task set.

6. A method as recited in claim 1, further comprising obtaining the second testing results by a procedure including:
   posing a task set for a subject to perform using the prompting syntax and the vocabulary set; and
   collecting dialogue information for at least one of the prompting syntax and the vocabulary set when the subject performs the task set.

7. A method as recited in claim 1, wherein selecting the vocabulary set includes:
  dividing user preferred words for the user interface into sub-vocabularies;
  testing each sub-vocabulary for pairwise acoustic similarity among the words thereof; and
  replacing a specified word of a sub-vocabulary with an alternative user-preferred word when the specified word is acoustically similar to another word in the sub-vocabulary.

* * * * *